US009351175B2

(12) United States Patent
Ruegamer et al.

(10) Patent No.: US 9,351,175 B2
(45) Date of Patent: May 24, 2016

(54) SYSTEM AND METHOD FOR DETERMINING AN INTERFERER TRANSMITTING AN INTERFERING SIGNAL

(71) Applicant: Fraunhofer-Gesellschaft zur Foerderung der angewandten Forschung e.V., Munich (DE)

(72) Inventors: Alexander Ruegamer, Nuremberg (DE); Ivana Lukcin, Legrad (HR)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 52 days.

(21) Appl. No.: 14/046,183

(22) Filed: Oct. 4, 2013

(65) Prior Publication Data

US 2014/0099901 A1 Apr. 10, 2014

Related U.S. Application Data

(60) Provisional application No. 61/710,131, filed on Oct. 5, 2012.

(30) Foreign Application Priority Data

Nov. 14, 2012 (EP) ...................................... 12192547

(51) Int. Cl.
*H04B 17/00* (2015.01)
*H04B 1/10* (2006.01)
*H04W 24/00* (2009.01)

(52) U.S. Cl.
CPC ............. *H04W 24/00* (2013.01); *H04B 1/1027* (2013.01)

(58) Field of Classification Search
CPC .......... H04B 1/04; H04B 1/40; H04B 1/0045; H04B 15/00; H04B 17/345; H04L 1/00; H04L 1/0045; H04L 27/2649; H04L 27/38
USPC ............... 455/63.1, 67.11, 67.13, 226.1, 296; 375/346, 340
See application file for complete search history.

(56) References Cited

U.S. PATENT DOCUMENTS 5,048,015 A * 9/1991 Zilberfarb ..................... 370/312
7,379,724 B2 * 5/2008 Nilsson et al. ................ 455/296
(Continued)

OTHER PUBLICATIONS

Proctor et al., "Protecting the UK Infrastructure a System to Detect GNSS Jamming and Interference," Inside GNSS, Sep./Oct. 2011, pp. 49-57.
(Continued)

*Primary Examiner* — Quochien B Vuong
(74) *Attorney, Agent, or Firm* — Keating & Bennett, LLP

(57) ABSTRACT

A system for determining an actual interferer transmitting an interfering signal including first frequency portions of the interfering signal in a predetermined frequency band of a useful signal is provided. The system includes a signal evaluator configured to determine for each possible interferer of the plurality of possible interferers coefficient information of the possible interferer based on representation information of the possible interferer and based on processing information, such that the coefficient information of the possible interferer and the representation information of the possible interferer together indicate the preprocessed signal, wherein the processing information and the preprocessed signal together indicate the compressed signal.

20 Claims, 13 Drawing Sheets
(3 of 13 Drawing Sheet(s) Filed in Color)

(56) References Cited

U.S. PATENT DOCUMENTS

| | | | | |
|---|---|---|---|---|
| 7,424,072 | B2* | 9/2008 | Hayashi et al. | 375/346 |
| 7,643,811 | B2* | 1/2010 | Reunamaki et al. | 455/226.2 |
| 8,059,700 | B2* | 11/2011 | Lopez-Risueno et al. | 375/150 |
| 8,213,553 | B2* | 7/2012 | Zhou et al. | 375/346 |
| 2007/0224952 | A1* | 9/2007 | Goldberg et al. | 455/132 |
| 2011/0170482 | A1* | 7/2011 | Dhanda | 370/328 |

OTHER PUBLICATIONS

Bauernfeind et al., "GNSS Interference Monitoring Network Based on Detection in Automotive ITS Station Receivers," 24th International Technical Meeting of the Satellite Division of the Institute of Navigation, Sep. 19-23, 2011, pp. 338-345.

Sun et al., "Interference Characteristics for the Civil Airport Environment using Time-Frequency Analysis," IEEE, 2012, pp. 347-354.

Mitch et al., "Signal Characteristics of Civil GPS Jammers," 24th International Technical Meeting of the Satellite Division of the Institute of Navigation, Sep. 19-23, 2011, pp. 1907-1919.

Bhatti et al., "Development and Demonstration of a TDOA-Based GNSS Interference Signal Localization System," IEEE, 2012, pp. 455-469.

Tropp et al., "Beyond Nyquist: Efficient Sampling of Sparse Bandlimited Signals," IEEE, Sep. 22, 2009, 24 pages.

Candés et al., "An Introduction to Compressive Sampling," IEEE Signal Processing Magazine [21], Mar. 2008, 10 pages.

Candés, "Compressive Sampling," Proceedings of the International Congress of Mathematicians, 2006, pp. 1-20.

Candés et al., "$\ell$-Magic: Recovery of Sparse Signals via Convex Programming," Oct. 2005, pp. 1-19.

Pati et al., "Orthogonal Matching Pursuit: Recursive Function Approximation with Applications to Wavelet Decomposition," IEEE, 1993, pp. 40-44.

Donoho et al., "Sparse Solution of Underdetermined Systems of Linear Equations by Stagewise Orthogonal Matching Pursuit," IEEE Transactions on Information Theory, vol. 58, No. 2, Feb. 2012, pp. 1094-1121.

Needell et al., "Cosamp: Iterative Signal Recovery from Incomplete and Inaccurate Samples," Apr. 17, 2008, pp. 1-30.

Kraus et al., "Survey of In-Car Jammers—Analysis and Modeling of the RF Signals and IF samples (suitable for active signal cancellation)," 24th International Technical Meeting of the Satellite Division of the Institute of Navigation, Sep. 19-23, 2011, pp. 430-435.

Needell, P. et al., "Uniform Uncertainty Principle and Signal Recovery Via Regularized Orthogonal Matching Pursuit," Found. Comput. Math., vol. 9, Jun. 5, 2008, pp. 317-334.

Needell, D., "Topics in Compressed Sensing," Dissertation, May 2009, 176 pages.

Foucart, S., "Sparse Recovery Algorithms: Sufficient Conditions in terms of Restricted Isometry Constants," Springer Proceedings in Mathematics, Approximation Theory XIII, Mar. 7-10, 2010, pp. 1-14.

Romberg, J., et al., "Compressive Sensing by Random Convolution," SIAM Journal on Imaging Science, vol. 2, Nov. 4, 2009, pp. 1098-1128.

Bajwa, W. et al., "Toeplitz-Structured Compressed Sensing Matrices," Proceedings of the 2007 IEEE/SP 14th Workshop on Statistical Signal Processing, Aug. 26-29, 2007, 5 pages.

* cited by examiner

SYSTEM AND METHOD FOR DETERMINING AN INTERFERER TRANSMITTING AN INTERFERING SIGNAL

CROSS-REFERENCE TO RELATED APPLICATIONS

This application claims priority from European Patent Application No. 12192547.3, filed on Nov. 14, 2012, and from U.S. Provisional Patent Application No. 61/710,131, filed on Oct. 5, 2012, both of which are incorporated herein in their entirety by reference.

The present invention relates to interference detection and, in particular, to a system and a method for determining an interferer transmitting an interfering signal

BACKGROUND OF THE INVENTION

Interference detection becomes more and more important. In particular, GNSS (global navigation satellite system) signals are extremely susceptible to all types of interference. Therefore the GNSS bands should be constantly monitored to detect possible threats. Moreover, for the same reasons, monitoring of other types of frequency bands may also be used, such as monitoring of UMTS (Universal Mobile Telecommunications System) bands, LTE (Long Term Evolution) bands, FM (frequency modulation) radio broadcasting bands or AM (amplitude modulation) radio broadcasting bands.

In the following, GNSS is considered as an exemplary frequency band. The concepts provided to solve the problems outlined below are equally applicable to other frequency bands, such as a communication signal band (e.g. a telecommunication signal band) using any kind of modulation technique, a radio signal band having a predefined bandwidth and a predefined center frequency, a navigation signal band or a telemetry signal band.

Since the GNSS bands are up to 100 MHz wide, receivers sampling at a Nyquist rate (i.e. at least twice the bandwidth) have very stringent requirements in terms of data rates and data storage.

FIG. 11 shows the L-band spectrum of the current and planned GPS and Galileo global navigation satellite system signals with the notation of their modulation names and carrier frequencies. Signals of a first group of signals are classified, e.g. signals for military purpose only. Furthermore, signals of a second group of signals are open signals. All current and upcoming signals are within the protected Radio Navigation Satellite Services (RNSS) band but only the L1/E1 and L5/E5 bands are within the even better protected spectrum allocated to Aeronautical Radio Navigation Services (ARNS). The other two GNSS bands, E6 and L2, only protected through the RNSS, suffer from radar, military transmissions, and other potentially strong interferers.

Due to the inherently low power of GNSS signals, e.g. approx. −127 dBm received signal power on earth, the GNSS bands are dominated by white Gaussian noise. The noise is about hundred to a few thousand times stronger than the GNSS signal itself. As a consequence, the GNSS signals are extremely susceptible to all types of interference. The interferences can be unintentional like the harmonics of certain oscillators that translate into single continuous wave (CW)-tones or multitones in the GNSS spectrum. Moreover in the E5a/L5 band, the GNSS service is sharing its bandwidth with systems like Distance Measuring Equipment (DME) and Tactical Air Navigation (TACAN) appearing as Gaussian shaped pulse signals. In the L2/E6 band strong military radar signals can appear. But, there are also more and more intentional interferers, so called jammers, readily available on the market, mostly sold over the internet, even if their use is illegal in most countries. The commercial jammers can often be characterized by a chirp signal. All these interferers have in common that a very small output power is sufficient to exceed the thermal noise floor and therefore to effectively affect the GNSS signals.

Since effective interference mitigation techniques, e.g. array processing, or frequency domain adaptive filtering—are mostly unavailable to mass-market GNSS receivers and still relatively uncommon in professional receivers, it is useful to monitor the GNSS bands of interest for later interference detection and elimination.

Different kinds of GNSS bands monitoring networks have already been installed, are currently under development or planned, see, for example, [1], [2], [3].

According to the state of the art, to monitor a GNSS band, basically the complete broadcast bandwidth has to be supervised, e.g. around 50 MHz for Galileo E1, GPS L2 and Galileo E6, 100 MHz for the complete E5 band, see, for example, FIG. 11.

The Nyquist-Shannon sampling theorem states that the sampling rate $F_s$ has to be at least twice the bandwidth of the signal to be digitized in order to avoid aliasing effects. So, according to the state of the art, the complete GNSS signal bandwidth has to be monitored is digitized. The useful Nyquist sampling rate of an analog-to-digital converter (ADC) used to digitize a 50 or 100 MHz bandwidth is therefore at least 100 or 200 mega samples per second (MSPS), respectively.

Moreover, the state of the art may use a high dynamic range, since the GNSS signals are around the thermal noise floor power while the interferers can easily reach 80 dB or more. So, a 14 or even 16 bit ADC (analog-to-digital converter) is needed according to the state of the art. The state of the art provides sophisticated 16 bit ADCs with 200 MSPS to digitize the complete E5 band but these ADCs are expensive and have very high power consumption and stringent jitter requirements. They also generate very high data rates resulting in very large files that need to be stored for post-processing.

E.g. the data acquisition system used in [4] to characterize different GNSS jammers features 16-bit I/Q samples with 62.5 MHz resulting in a raw data rate of 2 GBit/s or 250 MByte/s which is already too high for most hard drives for constant data recording. Such a system is not only very expensive but also produces very large amounts of raw data making storage and post-processing very cumbersome.

Thinking about building a regional interference monitoring network, a certain amount of stations have to be present to capture the raw signal and transmit their measurements (e.g. the raw data) to a central server. This server can then process the raw-snapshots, detect and possibly also localize the interference source (see [5]). The high raw-snapshot sizes of current Nyquist sampling data acquisition systems make the data transfer and storage very demanding since e.g. no mobile network connection can be used.

The problems outlined above also exist for other signals than GNSS, such as communication signals (e.g. telecommunication signals) using any kind of modulation technique, e.g. UMTS signals, LTE signals, FM radio broadcasting signals or AM radio broadcasting signals, radio signals having a predefined bandwidth and a predefined center frequency, navigation signals or telemetry signals.

SUMMARY

According to an embodiment, a system for determining an actual interferer transmitting an interfering signal including first frequency portions of the interfering signal in a predetermined frequency band of a useful signal may have: an antenna module for receiving a transmitted radio signal to acquire a received radio signal including second frequency portions of the transmitted radio signal in the predetermined frequency band, an RF front-end for processing the received radio signal to acquire a preprocessed signal, a signal demodulator for processing the preprocessed signal to acquire a compressed signal, a signal evaluator for identifying the actual interferer, wherein the signal evaluator is configured to determine for each possible interferer of the plurality of possible interferers coefficient information of said possible interferer based on representation information of said possible interferer and based on processing information, such that the coefficient information of said possible interferer and the representation information of said possible interferer together indicate the preprocessed signal, wherein the processing information and the preprocessed signal together indicate the compressed signal, wherein the signal evaluator is configured to determine a possible interferer of the plurality of possible interferers as the actual interferer based on the coefficient information of each of the plurality of possible interferers.

According to another embodiment, a method for determining an actual interferer transmitting an interfering signal including first frequency portions of the interfering signal in a predetermined frequency band of a useful signal may have the steps of: receiving a transmitted radio signal by an antenna module to acquire a received radio signal including second frequency portions of the transmitted radio signal in the predetermined frequency band, processing the received radio signal by an RF front-end to acquire a preprocessed signal, processing the preprocessed signal to acquire a compressed signal, determining for each possible interferer of the plurality of possible interferers coefficient information of said possible interferer based on representation information of said possible interferer and based on processing information, such that the coefficient information of said possible interferer and the representation information of said possible interferer together indicate the preprocessed signal, wherein the processing information and the preprocessed signal together indicate the compressed signal, and determining a possible interferer of the plurality of possible interferers as the actual interferer based on the coefficient information of each of the plurality of possible interferers.

Another embodiment may have a computer program for implementing the method of claim 15 when being executed on a computer or signal processor.

A system for determining an actual interferer transmitting an interfering signal comprising first frequency portions of the interfering signal in a predetermined frequency band of a useful signal is provided.

The system comprises an antenna module for receiving a transmitted radio signal to obtain a received radio signal comprising second frequency portions of the transmitted radio signal in the predetermined frequency band.

Moreover, the system comprises an RF front-end (radio frequency front-end) for processing the received radio signal to obtain a preprocessed signal.

Furthermore, the system comprises a signal demodulator for processing the preprocessed signal to obtain a compressed signal.

Moreover, the system comprises a signal evaluator for identifying the actual interferer. The signal evaluator is configured to determine for each possible interferer of the plurality of possible interferers coefficient information of said possible interferer based on representation information of said possible interferer and based on processing information, such that the coefficient information of said possible interferer and the representation information of said possible interferer together indicate the preprocessed signal, wherein the processing information and the preprocessed signal together indicate the compressed signal. Furthermore, the signal evaluator is configured to determine a possible interferer of the plurality of possible interferers as the actual interferer based on the coefficient information of each of the plurality of possible interferers.

Embodiments provide a compressed sensing random demodulator analog-to-information converter (AIC) architecture for interference detection. According to embodiments, only a sub-Nyquist sampling rate may be used which greatly reduces the ADC requirements and the size of the raw data output file.

In embodiments, for interference detection and recovery the AIC output is tested against several given interference models (assumed as a priori knowledge) using specific reconstruction algorithms. If successful, the original interference signal can be recovered. The structure of the AIC, the signal recovery, and the modeling of the interference source are described in detail. Moreover, according to embodiments, the performance of this method is assessed for three types of interference (CW, chirp, and pulse). Specifically, the interference detection probability is evaluated as a function of the interferences' signal-to-noise ratio (SNR) and of the downsampling factor used in the AIC.

According to embodiments, a priori knowledge about the interferer may be exploited. Although the location of the interferer signals is unknown within the monitored bandwidth, concepts of embodiments allow to utilize that the bandwidth of interferer signals are typically much smaller than that of the overall frequency band bandwidth.

Embodiments provide an efficient approach to detect all kinds of known interference sources using a compressed sensing analog-to-information converter (AIC) featuring a sub-Nyquist rate sampling process. The requirements for this concept are some a priori knowledge about the interference signals to be detected (the interference signals may e.g. be CW-tones, certain chirp or pulse signals) and the existence of a domain where the interference signal's representation is sparse. Then, the ADC's sampling rate can be decreased to approx. $O(k \log^6 W)$, where k is the number of interferences, and W is the bandwidth to be monitored [6]. As an example: instead of the 200 MSPS that would normally be useful, the compressed sensing AIC technique could detect one CW-tone or one kind of chirp interferer within the 100 MHz E5-band, using approximately 330 kSPS, a reduction factor of more than 600.

The extremely low ADC sampling rate in the AIC helps to minimize the raw-snapshot size: The signal is "compressed" since only a certain signature and not the signal itself is stored. This enables an interference monitoring network where the compressed raw-samples are shared using an inexpensive low-rate mobile network connection. The compressed raw-samples are then post-processed on a central server with high computational power and a catalog of characterized interference templates that can then be detected and optionally also localized.

In embodiments, the system furthermore may comprise a database having stored therein the representation information for each possible interferer of the plurality of possible interferers. The signal evaluator may be configured to obtain for each possible interferer of the plurality of possible interferers the interferer representation information of said interferer from the database. Moreover, the database may be configurable so that further representation information of further possible interferers is storable in the database.

According to some embodiments, the system may be configured to determine the actual interferer transmitting the interfering signal comprising signal portions in the predetermined frequency band of the useful signal, wherein the useful signal is a GNSS signal, a UMTS signal or an LTE signal and wherein the predetermined frequency band is a frequency band of the GNSS signal, the UMTS signal or the LTE signal. The antenna module may be configured to receive the transmitted radio signal to obtain the received radio signal comprising signal portions in the predetermined frequency band being the frequency band of the GNSS signal, the UMTS signal or the LTE signal. Furthermore, the RF front-end may be configured to process the received radio signal comprising the signal portions in the frequency band of the GNSS signal, the UMTS signal or the LTE signal to obtain the preprocessed signal.

In another embodiment, the system may be configured to determine the actual interferer transmitting the interfering signal, wherein the interfering signal may e.g. be a continuous wave signal, a chirp signal or a pulse signal.

According to some embodiments, the signal demodulator may comprise a sequence demodulator for modulating the preprocessed signal with a predeterminded data sequence to obtain a demodulated signal. Moreover, the signal demodulator may be configured to determine the compressed signal based on the demodulated signal.

In other embodiments, the signal demodulator may furthermore comprise a filter unit for conducting a filter operation on the demodulated signal to obtain a filtered signal. The signal demodulator may furthermore be configured to determine the compressed signal based on the filtered signal.

In an embodiment, the filter unit may be a Finite Impulse Response filter (FIR filter).

According to embodiments, the signal demodulator may furthermore comprise an analog-to-digital converter for converting the filtered signal being an analog signal into the compressed signal being a digital signal.

In some embodiments, the signal evaluator may be configured to determine for each possible interferer of the plurality of possible interferers a coefficient vector x of said possible interferer as the coefficient information of said possible interferer according to the formula $\hat{y}=A \cdot x$, wherein $\hat{y}$ may be a first vector indicating the compressed signal, wherein A is a measurement matrix of said possible interferer, wherein the measurement matrix may depend on the representation information of said possible interferer and on the processing information.

According to embodiments, the signal evaluator may be configured to determine for each possible interferer of the plurality of possible interferers sparsity information of said possible interferer, wherein the coefficient vector x of said possible interferer may comprise a plurality of coefficients, and wherein the signal evaluator may be configured to determine the sparsity information based on the plurality of coefficients of the coefficient vector of said possible interferer. Moreover, wherein the signal evaluator may be configured to determine a possible interferer of the plurality of possible interferers as the actual interferer based on the sparsity information of each of the plurality of possible interferers.

In embodiments, the signal evaluator may be configured to determine for each possible interferer of the plurality of possible interferer a coefficient vector x of said possible interferer as the coefficient information of said possible interferer according to the formula $\hat{y}=A \cdot x$, wherein $\hat{y}$ may be a first vector indicating the compressed signal, wherein A may be a measurement matrix of said possible interferer, wherein the measurement matrix A may be defined according to the formula $A=R \cdot H \cdot D \cdot \Psi$, wherein R, H, D and $\Psi$ may be matrices, wherein $\Psi$ may indicate the representation information of said interferer, wherein the processing information may comprise the matrices R, H and D, wherein $f_{spread}=D \cdot f$ may define the demodulated signal, wherein $f_{spread}$ may be a second vector indicating the demodulated signal, and wherein f is a third vector indicating the preprocessed signal, wherein $y=H \cdot D \cdot f$, may define the filtered signal (e.g. one may also refer to the filtered signal y as a demodulated filtered signal), wherein y may be a fourth vector indicating the filtered signal, and wherein $\hat{y}=R \cdot H \cdot D \cdot f$ may define the compressed signal (e.g. one may also refer to the compressed signal $\hat{y}$ as a demodulated, filtered and compressed signal $\hat{y}$).

In some embodiments, the signal evaluator may be configured to apply a signal reconstruction algorithm to determine the possible interferer of the plurality of possible interferers. For example, the signal evaluator may be configured to apply a Compressed Sampling Matching Pursuit (CoSaMP), a brute force algorithm or a greedy algorithm as the signal reconstruction algorithm to determine the possible interferer of the plurality of possible interferers. In other embodiments, the signal reconstruction algorithm may be an OMP algorithm (Orthogonal Matching Pursuit algorithm), a ROMP algorithm (Regularized OMP algorithm) or a StOMP algorithm (Stagewise OMP algorithm).

Moreover, a method for determining an actual interferer transmitting an interfering signal comprising first frequency portions of the interfering signal in a predetermined frequency band of a useful signal is provided. The method comprises:

Receiving a transmitted radio signal by an antenna module to obtain a received radio signal comprising second frequency portions of the transmitted radio signal in the predetermined frequency band, Processing the received radio signal by an RF front-end to obtain a preprocessed signal, Processing the preprocessed signal to obtain a compressed signal, Determining for each possible interferer of the plurality of possible interferers coefficient information of said possible interferer based on representation information of said possible interferer and based on processing information, such that the coefficient information of said possible interferer and the representation information of said possible interferer together indicate the preprocessed signal, wherein the processing information and the preprocessed signal together indicate the compressed signal, and Determining a possible interferer of the plurality of possible interferers as the actual interferer based on the coefficient information of each of the plurality of possible interferers.

In embodiments, the method may further comprise the step of identifying for each possible interferer of the plurality of possible interferers the representation information of said possible interferer.

According to some embodiments, the step of identifying for each possible interferer of the plurality of possible interferers the representation information of said possible interferer may be conducted based on a candidate signal being assigned to said interferer and by determining a candidate coefficient vector x of said possible interferer such that the formula $f^{(i)}=\Psi \cdot x$ holds true, wherein $f^{(i)}$ may be the candidate signal being assigned to said interferer, wherein $\Psi$ may be a matrix indicating the representation information of said interferer, wherein x may be the candidate coefficient vector comprising a plurality of coefficients, wherein the candidate coefficient vector x may be determined according to a sparsity rule.

In embodiments, the step of identifying for each possible interferer of the plurality of possible interferers the representation information of said possible interferer may comprise determining the candidate coefficient vector x of said possible interferer according to the sparsity rule so that at least some of the coefficients of said coefficient vector x are zero.

According to some embodiments, the step of identifying for each possible interferer of the plurality of possible interferers the representation information of said possible interferer may comprise determining the candidate coefficient vector x of said possible interferer according to the sparsity rule so that at least some of the coefficients of said coefficient vector x belong to a first group of coefficients, so that all the other coefficients of the said coefficient vector x belong to a second group of coefficients, and so that the arithmetic average of the values of the coefficients of the first group of coefficients is at least 100 times greater than the arithmetic average of the values of the coefficients of the second group of coefficients.

Moreover, a computer program for implementing the above-described method when being executed on a computer or signal processor is provided.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Embodiments of the present invention will be detailed subsequently referring to the appended drawings, in which.

DETAILED DESCRIPTION OF THE INVENTION

Figure 1A:
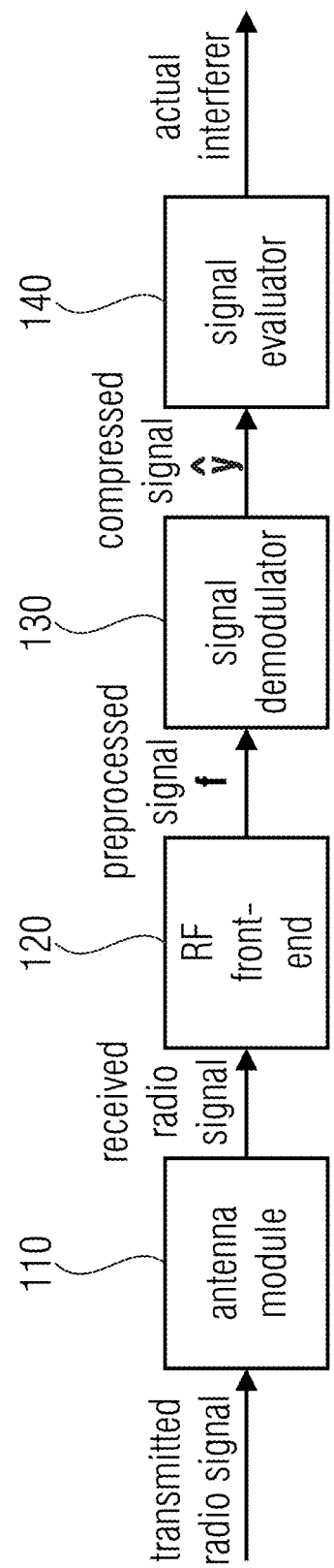
FIG. 1a illustrates a system for determining an actual interferer transmitting an interfering signal according to an embodiment.

FIG. 1a illustrates a system for determining an actual interferer transmitting an interfering signal comprising first frequency portions of the interfering signal in a predetermined frequency band of a useful signal. The interferer may e.g. be a transmitter transmitting a sine wave signal, a chirp signal or a pulse signal. The predetermined frequency band may e.g. be a GNSS frequency band.

The useful signal may e.g. be a GNSS signal. In other embodiments, the useful signal may be a communication signal (e.g. a telecommunication signal) using any kind of modulation technique, e.g. a UMTS signal, an LTE signal, a FM radio broadcasting signal or an AM radio broadcasting signal, a radio signal having a predefined bandwidth and a predefined center frequency, any (other) navigation signal or a telemetry signal.

The system comprises an antenna module 110 for receiving a transmitted radio signal to obtain a received radio signal comprising second frequency portions of the transmitted radio signal in the predetermined frequency band.

Moreover, the system comprises an RF front-end 120 for processing the received radio signal to obtain a preprocessed signal f.

Furthermore, the system comprises a signal demodulator 130 for processing the preprocessed signal f to obtain a compressed signal ŷ.

Moreover, the system comprises a signal evaluator 140 for identifying the actual interferer.

The signal evaluator 140 is configured to determine for each possible interferer of the plurality of possible interferers coefficient information x of said possible interferer based on representation information Ψ of said possible interferer and based on processing information R, H, D, such that the coefficient information x of said possible interferer and the representation information Ψ of said possible interferer together indicate the preprocessed signal f, wherein the processing information R, H, D and the preprocessed signal f together indicate the compressed signal ŷ. Furthermore, the signal evaluator 140 is configured to determine a possible interferer of the plurality of possible interferers as the actual interferer based on the coefficient information of each of the plurality of possible interferers.

Figure 1B:
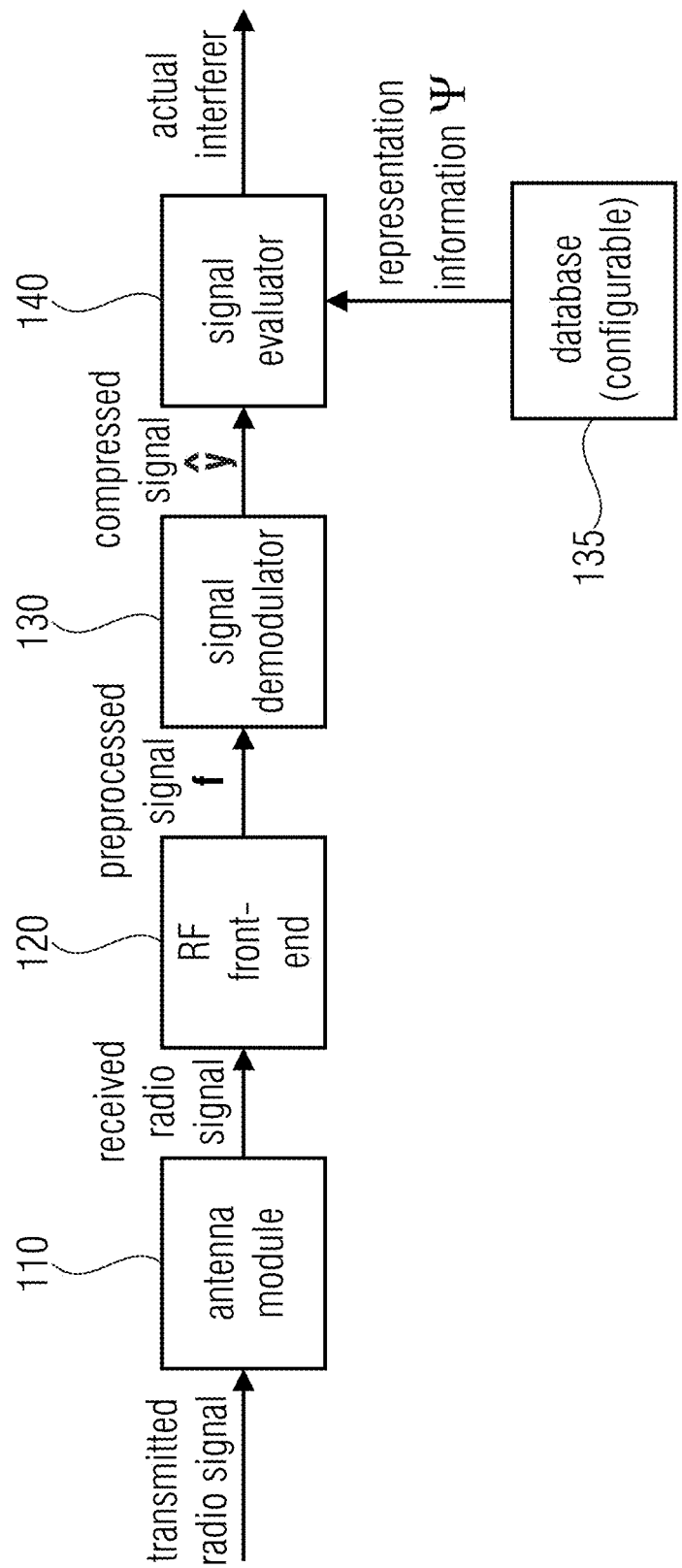
FIG. 1b illustrates a system for determining an actual interferer transmitting an interfering signal according to another embodiment.

FIG. 1b illustrates a system for determining an actual interferer transmitting an interfering signal according to another embodiment. The system furthermore comprises a database 135 having stored therein the representation information Ψ for each possible interferer of the plurality of possible interferers. The signal evaluator 140 is configured to obtain for each possible interferer of the plurality of possible interferers the interferer representation information of said interferer from the database. Moreover, the database 135 is configurable so that further representation information of further possible interferers is storable in the database.

In some embodiments, the system is configured to determine the actual interferer transmitting the interfering signal comprising signal portions in the predetermined frequency band of the useful signal, wherein the useful signal is a GNSS signal, and wherein the predetermined frequency band is a frequency band of the GNSS signal. In such embodiments, the antenna module 110 is configured to receive the transmitted radio signal to obtain the received radio signal comprising signal portions in the predetermined frequency band being the frequency band of the GNSS signal. Furthermore, in such embodiments, the RF front-end 120 is configured to process the received radio signal comprising the signal portions in the frequency band of the GNSS signal to obtain the preprocessed signal.

In the following, GNSS Interference Detection using a Compressed Sensing Analog to Information Converter Approach is explained in more detail.

At first, an AIC Interference Detection Receiver is provided. For this purpose, compressed sensing is explained.

Compressed sensing is a data acquisition protocol which samples at a sub-Nyquist rate and later reconstructs the original data from an incomplete set of measurements.

Let $f \in \mathbb{C}^n$ be the signal to be recovered. Instead of f only n measurements are stored in the vector $y \in \mathbb{C}^n$. The sensing matrix $\Phi$ makes the connection between signal and measurements by forming a linear system $$y = \Phi f. \quad (1)$$

For the compression only m ≪ n out of all n measurements are used. So the measurement system is $$\hat{y} = Ry = R\Phi f \in \mathbb{C}^m, \quad (2)$$

where R is an m×n matrix that samples m out of n measurements. This system is generally ill-posed because it has no unique solution or, in other words, underdetermined with an infinite number of solutions.

The theory of compressed sensing claims that this ill-posed system can be solved and the signal f recovered if a proper base representation matrix $\Psi$ is chosen in which this signal has a unique sparse representation, see [7], [8].

The signal f can be expanded in an orthonormal basis $\Psi$ where it has a sparse representation x:

$$f = \Psi x \quad (3)$$

Moreover an incoherency between the sensing matrix $\Phi$ and the representation matrix $\Psi$ is useful. The coherence can be measured according to:

$$\mu(\Phi, \Psi) = \sqrt{n} \cdot \max_{1 \le k, j \le n} |\langle \phi_k, \psi_j \rangle|. \quad (4)$$

(see [7]).

The low coherence can be obtained e.g. by using an independent identically distributed Gaussian random sensing matrix $\Phi$ with ±1 binary entries and any fixed representation for $\Psi$. The incoherency ensures that the small number of taken samples still contains enough information for a successful reconstruction afterwards.

Under these and some further assumptions it can be shown that the undetermined linear system can be solved thanks to the sparsity of the signal in the appropriately chosen representation basis.

In the following, an exemplary hardware implementation is provided.

For the interference detection receiver described hereafter, the sampling process is performed by an AIC hardware converter using a random demodulator.

A basic idea of the random demodulator is that if a signal, which may have to have a sparse representation in a known domain, is spread with a pseudorandom sequence, a distinct signature of the signal is present over all frequencies. If then only a small portion of the spectrum is recorded, e.g. using a low-pass filter, the amount of information acquired is still sufficient to enable the full reconstruction of the signal.

The reconstruction algorithm then uses the information of the hardware AIC—namely the filter response, the pseudorandom sequence used, the compression or downsampling ratio—and the information about the domain in which the signal to be reconstructed has a sparse representation to recover the signal.

Figure 2:
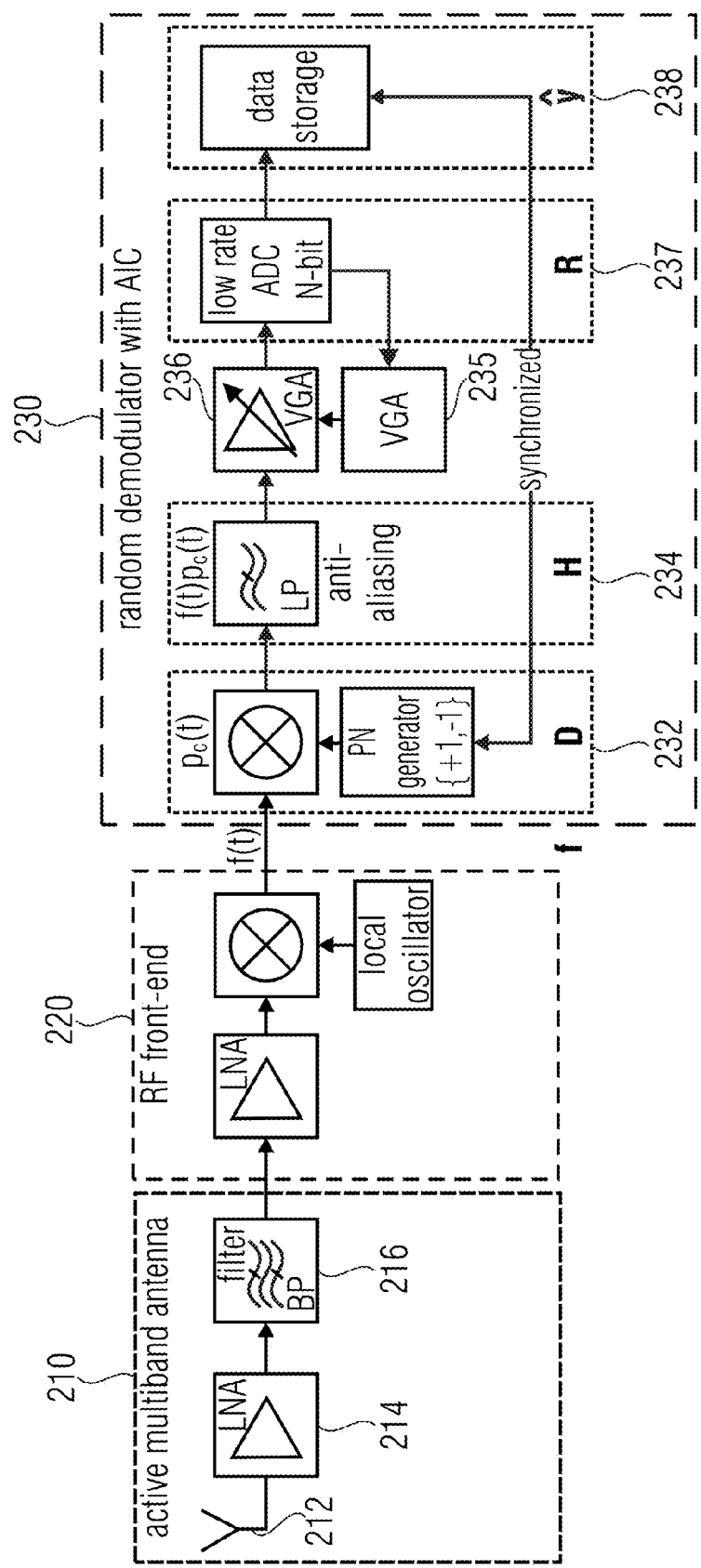
FIG. 2 illustrates a block diagram of an AIC interference detection receiver.

In FIG. 2, a block diagram of the AIC interference detection receiver is illustrated. In particular, FIG. 2 shows the block diagram of a possible hardware implementation of the AIC interference detection receiver.

In FIG. 2, an antenna module 210, here, an active multiband antenna, is used to receive the GNSS band to be monitored. An antenna element 212 receives a transmitted (GNSS) radio signal. The first low noise amplifier (LNA) 214 guarantees a good overall noise figure for the receiver according to Friis' Formula. An RF bandpass filter 216 then attenuates all unwanted out-of-band frequencies.

In the RF front-end 220, the received radio signal (which may also be referred to as an "antenna output signal") is amplified again and down-converted using either a real mixer or a complex I/Q demodulator to an intermediate frequency or complex baseband signal f(t), respectively.

A demodulator 230, here, a random demodulator with AIC, comprises a sequence demodulator 232, e.g. a pseudorandom sequence demodulator, a filter unit 234, e.g. an anti-aliasing low-pass filter and an analog-to-digital converter 237, e.g. with an appropriate automatic gain control (AGC). The filter unit 234 may, for example, be a Finite Impulse Response filter (FIR filter). Moreover, optionally the demodulator 230 may comprise a data storage device 238. Furthermore, the demodulator 230 may optionally comprise an AGC 235 which may employ a variable gain amplifier (VGA) 236 to ensure that the ADC's input signal is within the full scale range providing the maximum effective number of bits.

The (pseudorandom) sequence demodulator 232 uses a predefined ±1 data sequence p(t) with a sampling rate $P_c$ being the Nyquist rate for the signal of interest. The length of the pseudorandom sequence is conditioned by the number of samples n to be acquired. Moreover the pseudorandom sequence is synchronized to the data storage device which is useful for the later reconstruction phase. Since only multiplications with ±1 may be used, the random demodulator can be efficiently implemented in hardware e.g. using simple flip-flops.

Referring to the theoretical model, the signal f is first modulated with a pseudorandom sequence $p = (p_1, \ldots, p_n)$ and $p_i \in \{-1, 1\}$ resulting in $f_{spread} = Df$, for a pseudorandom matrix $D \in \mathbb{R}^{n \times n}$ $$D = \begin{bmatrix} p_1 & 0 & \cdots & 0 \\ 0 & p_2 & \cdots & 0 \\ \vdots & \vdots & \ddots & \vdots \\ 0 & \cdots & \cdots & p_n \end{bmatrix}.$$

Thus, $f_{spread} = D \cdot f$ defines a vector $f_{spread}$ indicating the demodulated signal (e.g. $f_{spread}$ may be considered as a filtered and demodulated signal), wherein f is a third vector indicating the preprocessed signal.

The spread output of the random demodulator 230 is filtered by a filter unit 234, e.g. an anti-aliasing low-pass filter, whose bandwidth is set according to the Nyquist frequency of the subsequent low-rate ADC. It is assumed that the filter behavior can be described with filter coefficients in h(t) having an order l. The filtering process can be described through the following set of equations $$y(1) = h(1)f_{spread}(1)$$
$$y(2) = h(1)f_{spread}(2) + h(2)f_{spread}(1)$$
$$y(3) = h(1)f_{spread}(3) + h(2)f_{spread}(2) + h(3)f_{spread}(1)$$
$$\vdots$$
$$y(n) = h(1)f_{spread}(n) + h(2)f_{spread}(n-1) + \ldots + h(l)f_{spread}(n-l+1)$$

or using the low-pass filter matrix $H \in \mathbb{R}^{n \times n}$ $$H = \begin{bmatrix} h(1) & 0 & \ldots & \ldots & \ldots & 0 & 0 \\ h(2) & h(1) & \ldots & \ldots & \ldots & 0 & 0 \\ \vdots & \ddots & \ddots & \ddots & \ddots & \ddots & \vdots \\ 0 & 0 & \ldots & h(l-1) & \ldots & h(1) & 0 \\ 0 & 0 & \ldots & h(l) & \ldots & h(2) & h(1) \end{bmatrix}$$

the system can be rewritten as $$y = Hf_{spread} = \underbrace{HD}_{\Phi}f = \Phi f. \tag{5}$$

Thus, y=H·D·f defines a vector y indicating the filtered signal.

Between the pseudorandom sequence generator's sampling or chipping rate $P_c$ and the ADC sampling rate $F_s$, a compression ratio or downsampling factor DSF can be defined. It basically provides the advantage of the whole concept since instead of n acquired samples, only m samples have to be stored with m≪ n:

$$DSF = P_c/F_s = n/m \tag{6}$$

For a rational compression ratio, the compression matrix $R \in \mathbb{R}^{m \times n}$ can be described as $$R = \begin{bmatrix} 1 \ldots 0 & \ldots & \ldots & \ldots & 0 \\ \underline{0 \ldots 0} & 1 & 0 & \ldots & 0 \\ \lfloor DSF \rfloor - 1 & & & & \\ \vdots & \ddots & \ddots & \ddots & \vdots \\ 0 \ldots 0 & \ldots & \ldots & \ldots & \end{bmatrix}.$$

After this downsampling or compression the systems provides the measurement output as $$\hat{y} = R\Phi f. \tag{7}$$

Thus, ŷ=R·H·D·f defines a vector ŷ indicating the compressed signal.

The matrices R, H, D may be referred to as processing information.

In the following, signal recovery is described, inter alia with reference to FIG. 3.

The goal of the signal recovery process is to reconstruct a discretized version of the original signal f(t) with a sampling rate $P_c$ using the compressed measurements ŷ, the information of the random demodulator RΦ, and the a priori knowledge of the signal to be recovered, e.g. in which base Ψ the signal f has a sparse representation coefficient vector x. Putting all this information together the measurement matrix A is introduced, see also FIG. 3:

$$\hat{y} = \underbrace{R\Phi\Psi}_{A}x = Ax. \tag{8a}$$

As Φ=HD equation (8a) may be expressed by equation (8b) as:

$$\hat{y} = RHD\Psi x = Ax \tag{8b}$$

Thus, the measurement matrix A may be expressed by formula (8c):

$$A = RHD\Psi \tag{8c}$$

Figure 3:
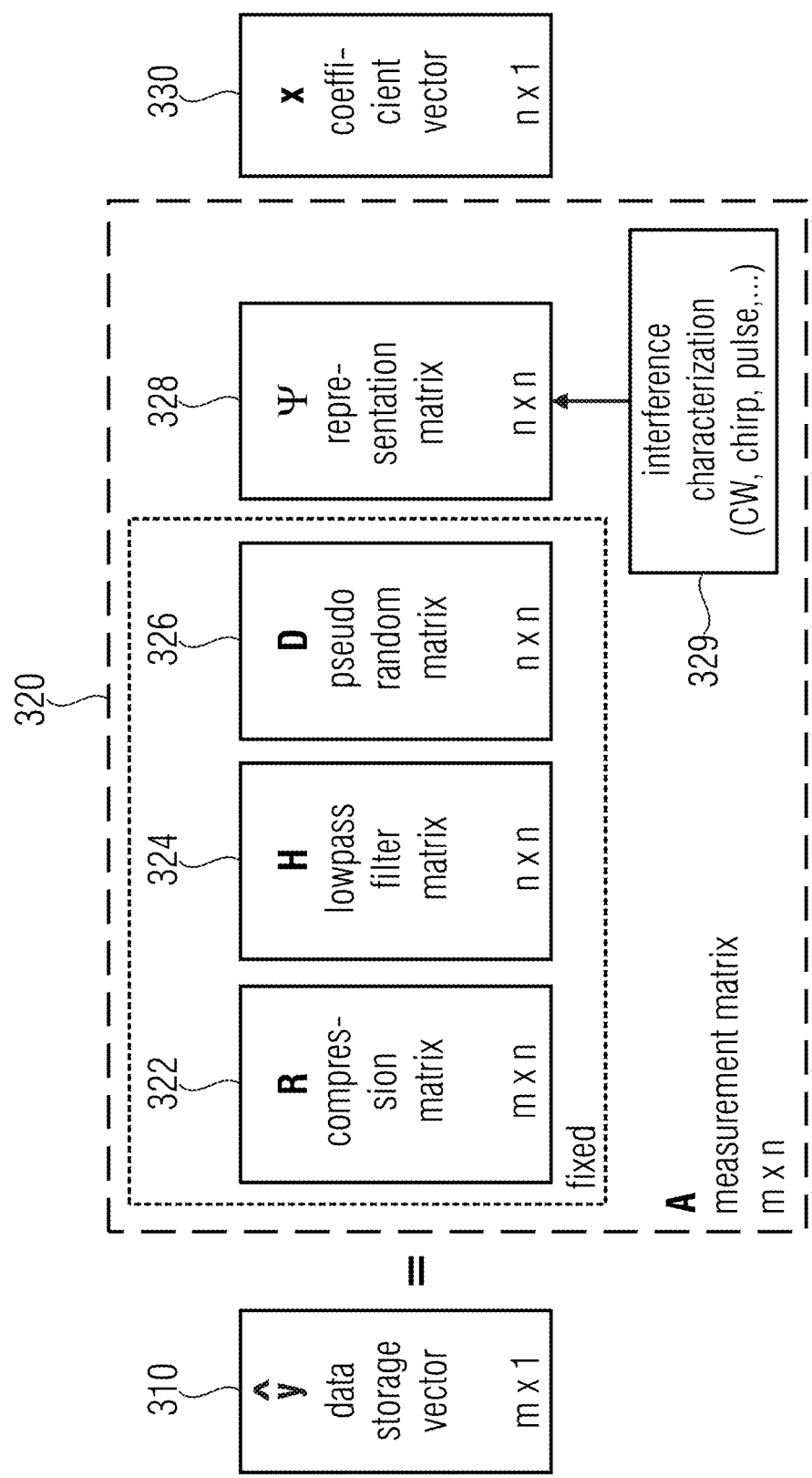
FIG. 3 illustrates a block diagram of the signal recovery with m≪n samples.

FIG. 3 illustrates a block diagram of the signal recovery with m≪ n samples. In particular, FIG. 3 illustrates the data storage vector ŷ (310), the measurement matrix A (320) the coefficient vector x (330). The measurement matrix A (320) results from the matrices R (322), H (324), D (326) which are fixed, and from the representation matrix Ψ (328). The representation matrix Ψ (328) represents an interference characterization (329).

Having solved this equation for x, a discretized version of the original signal f(t) can easily be found since f=Ψx.

Different signal recovery algorithms can be found in the literature e.g. greedy pursuits, convex relaxation, combinatorial algorithms classes [9], [10], [11], [12], [13]. Convex relaxation algorithms are very successful in reaching a good solution but are computationally expensive. The greedy pursuits algorithms are known for their speed but there is also a group of the combinatorial algorithms that are even faster than greedy algorithms with very strict requirements on the measurement matrix, see [14].

The signal evaluator, for example, the signal evaluator 140 of FIG. 1*a* or FIG. 1*b*, may be configured to apply a signal reconstruction algorithm to determine the possible interferer of the plurality of possible interferers. For example, the signal evaluator 140 may be configured to apply a Compressed Sampling Matching Pursuit (CoSaMP), a brute force algorithm or a greedy algorithm as the signal reconstruction algorithm to determine the possible interferer of the plurality of possible interferers. Or, the signal reconstruction algorithm may, for example, be an OMP algorithm (Orthogonal Matching Pursuit algorithm), a ROMP algorithm (Regularized OMP algorithm) or a StOMP algorithm (Stagewise OMP algorithm).

Two signal recovery algorithms are used for the simulations presented later on in this paper: CoSaMP (Compressive Sampling Matching Pursuit) and a brute force algorithm.

The CoSaMP, as described in [13], is based on a greedy pursuit approach that incorporates ideas from combinatorial algorithms to guarantee speed and to provide rigorous error bounds. The performance of the CoSaMP algorithm largely depends on the restricted isometry property (RIP).

For each integer K=1; 2; . . . , the isometry constant $\delta_K$ of a matrix A is defined as the smallest number for which $$(1-\delta_K)\|x\|_{l_2}^2 \leq \|Ax\|_{l_2}^2 \leq (1+\delta_K)\|x\|_{l_2}^2 \tag{9}$$

holds for all K-sparse vectors x. The vector x is said to be K-sparse if it has only K nonzero elements.

It can be loosely stated that a matrix A obeys the RIP of order K if $\delta_K$ is not too close to one. In other words if A obeys the RIP then A approximately preserves the Euclidean length of K-sparse signals. RIP is equivalent to the fact that all subsets of K columns taken from A are actually nearly orthogonal. The basic requirement for a good reconstruction of CoSaMP is that the measurement matrix A satisfies RIP for K-sparse vector x if $$\delta_k < \sqrt{2/(5+\sqrt{73})},$$

see [15]. The CoSaMP starts with the initial approximation x=0 in order to recover the K-sparse solution. At each step the residual vector $$r = Ax - \hat{y} \quad (10)$$

and the correlation vector $$u = A^*r = A^*(Ax - \hat{y}) \quad (11)$$

are computed.

Thanks to the RIP, for the K-sparse signal x the vector A*Ax can serve as a proxy for the signal because the energy in each set of K components of the mentioned vector approximates the energy in the corresponding K components of x. This is the main reason behind the identification of the 2K largest components in u, or the components with the largest energy, whose indexes are put in the set I (which was at the beginning an empty set). On this set a least squares problem is solved $$A_I x_I = \hat{y} \quad (12)$$

where the matrix $A_I$ is the restriction of A to set I by just taking the columns at positions defined in I. The solution at each step is equal to $x_I$ for positions in I and elsewhere 0. The process is repeated until a certain number of steps is done or until CoSaMP reaches a predefined tolerance on the residual.

Another approach is the brute force recovery. It may be used in special cases where the reconstruction phase is not blind. Using the a priori information the signal may be efficiently recovered with low computational cost.

In the special case when only one interferer shall be recovered (the sparsity is therefore one and only a single element of x is one), the brute force method calculates all possible residuals $r_k$ with k=1, ..., n over all n combinations by $$r_k = \|A(:,k) - \hat{y}\|_2. \quad (13)$$

The minimum of all $r_k$, $r_{min}$ is the most likely solution. By using a certain threshold between the minimum $r_{min}$ and the second minimum of the residuals, it is possible to decide if the tested interferer was present or not.

Summarizing the above, and explained in other words with reference to a signal evaluator, such as the signal evaluator 140 of FIGS. 1a and 1b, in some embodiments, the signal evaluator 140 may be configured to determine for each possible interferer of the plurality of possible interferers a coefficient vector x of said possible interferer as the coefficient information of said possible interferer according to the formula $\hat{y} = A \cdot x$.

$\hat{y}$ may be a first vector indicating the compressed signal. A may be a measurement matrix of said possible interferer. The measurement matrix A may depend on the representation information Ψ of said possible interferer and on the processing information R, H, D.

The signal evaluator 140 may be configured to determine for each possible interferer of the plurality of possible interferers sparsity information of said possible interferer, wherein the coefficient vector x of said possible interferer may comprise a plurality of coefficients, and wherein the signal evaluator 140 may be configured to determine the sparsity information based on the plurality of coefficients of the coefficient vector x of said possible interferer. Moreover, wherein the signal evaluator 140 may be configured to determine a possible interferer of the plurality of possible interferers as the actual interferer based on the sparsity information of each of the plurality of possible interferers.

In embodiments, the signal evaluator 140 may be configured to determine for each possible interferer of the plurality of possible interferer a coefficient vector x of said possible interferer as the coefficient information of said possible interferer according to the formula $\hat{y} = A \cdot x$, wherein $\hat{y}$ may be a first vector indicating the compressed signal, wherein A may be a measurement matrix of said possible interferer, wherein the measurement matrix A may be defined according to the formula A=R·H·D·Ψ, wherein R, H, D and Ψ may be matrices. Ψ may indicate the representation information of said interferer, wherein the processing information may comprise the matrices R, H and D, wherein $f_{spread} = D \cdot f$ may define the demodulated signal (e.g. may define a vector representing the demodulated signal), wherein $f_{spread}$ may be a second vector indicating the demodulated signal, and wherein f is a third vector indicating the preprocessed signal, wherein $y = H \cdot D \cdot f$, may define the filtered signal (e.g. may define a vector representing the filtered signal), wherein y may be a fourth vector indicating the filtered signal, and wherein $\hat{y} = R \cdot H \cdot D \cdot f$ may define the compressed signal $\hat{y}$ (e.g. may define a vector representing the compressed signal).

In some embodiments, the system may be configured to determine the actual interferer transmitting the interfering signal, wherein the interfering signal may be a continuous wave signal, a chirp signal or a pulse signal.

Figure 1C:
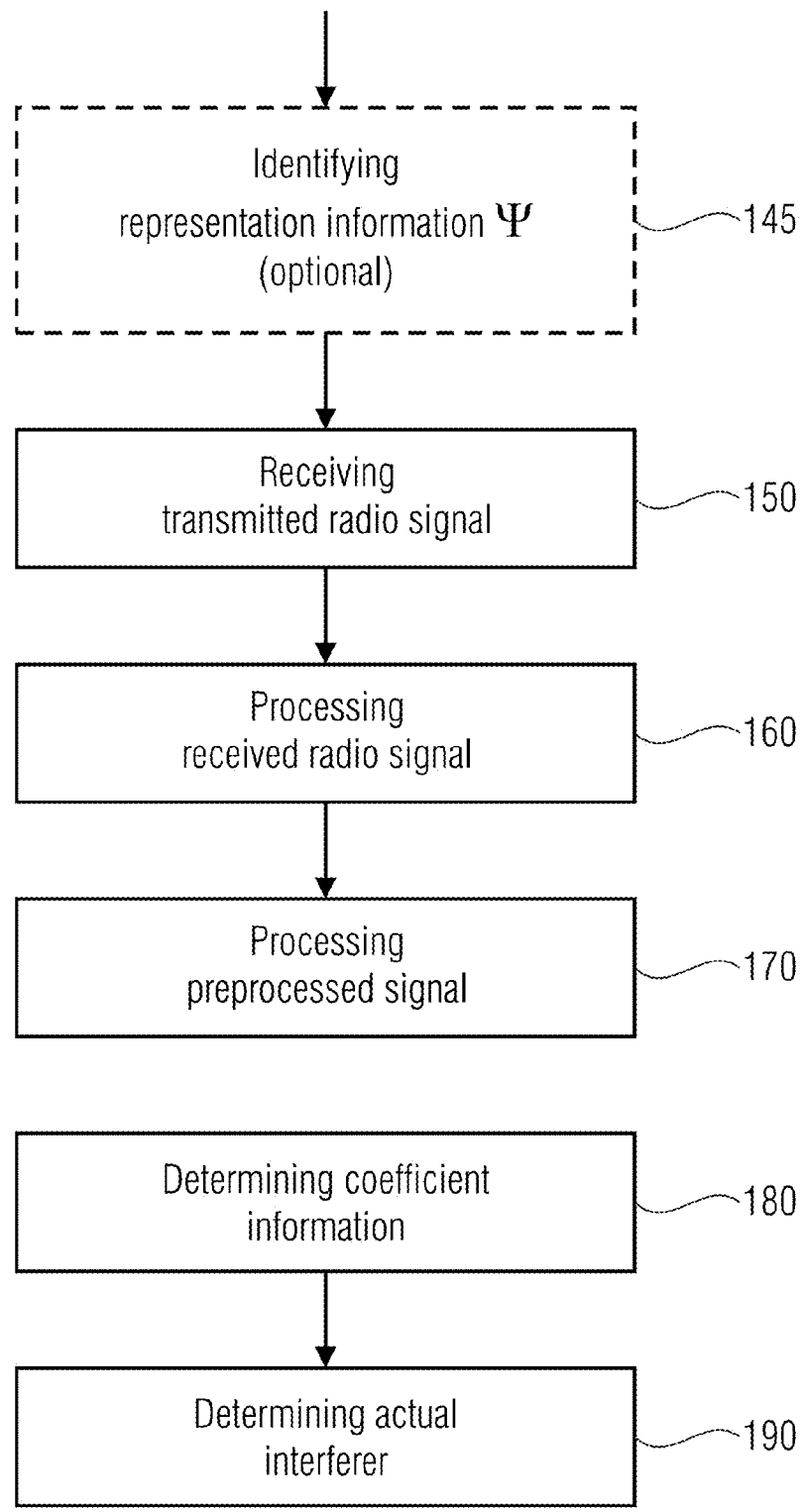
FIG. 1c illustrates a method for determining an actual interferer transmitting an interfering signal according to an embodiment.

FIG. 1c illustrates a method for determining an actual interferer transmitting an interfering signal comprising first frequency portions of the interfering signal in a predetermined frequency band of a useful signal according to an embodiment.

The method comprises the steps:

Receiving a transmitted radio signal by an antenna module to obtain a received radio signal comprising second frequency portions of the transmitted radio signal in the predetermined frequency band (step 150).

Processing the received radio signal by an RF front-end to obtain a preprocessed signal (step 160) f.

Processing the preprocessed signal to obtain a compressed signal $\hat{y}$ (step 170).

Determining for each possible interferer of the plurality of possible interferers coefficient information x of said possible interferer based on representation information of said possible interferer and based on processing information R, H, D, such that the coefficient information x of said possible interferer and the representation information Ψ of said possible interferer together indicate the preprocessed signal f, wherein the processing information R, H, D and the preprocessed signal f together indicate the compressed signal $\hat{y}$ (step 180). And:

Determining a possible interferer of the plurality of possible interferers as the actual interferer based on the coefficient information x of each of the plurality of possible interferers (step 190).

Optionally, the method may further comprise the step of identifying for each possible interferer of the plurality of possible interferers the representation information of said possible interferer (step 145).

According to some embodiments, the step of identifying (step 145) for each possible interferer of the plurality of possible interferers the representation information of said possible interferer may be conducted based on a candidate signal being assigned to said interferer and by determining a candidate coefficient vector x of said possible interferer such that the formula $f^{(i)} = \Psi \cdot x$ holds true, wherein $f^{(i)}$ may be the candidate signal being assigned to said interferer, wherein Ψ may be a matrix indicating the representation information of said interferer, wherein x may be the candidate coefficient vector comprising a plurality of coefficients, wherein the candidate coefficient vector x may be determined according to a sparsity rule.

In embodiments, the step of identifying (step 145) for each possible interferer of the plurality of possible interferers the representation information of said possible interferer may comprise determining the candidate coefficient vector x of said possible interferer according to the sparsity rule so that at least some of the coefficients of said coefficient vector x are zero.

According to some embodiments, the step of identifying (step 145) for each possible interferer of the plurality of possible interferers the representation information of said possible interferer may comprise determining the candidate coefficient vector x of said possible interferer according to the sparsity rule so that at least some of the coefficients of said coefficient vector x belong to a first group of coefficients, so that all the other coefficients of the said coefficient vector x belong to a second group of coefficients, and so that the arithmetic average of the values of the coefficients of the first group of coefficients is at least 100 times greater than the arithmetic average of the values of the coefficients of the second group of coefficients.

In the following, interference characterization is described.

Before an interference can be reconstructed or detected from the AIC output data, the interference source may be known in a carefully characterized way. This a priori knowledge is useful for this compressed sensing interference detection method to work.

As depicted in FIG. 3, the product of the RHD matrices stays the same for each recovery process. The representation matrix $\Psi$ has to be adapted for each kind of interferer. This adaptation is happening within the interference characterization step described in detail in the following. To conclude, for each interference to be checked a measurement matrix A (or its conjugate transpose) has to be calculated and can then be stored e.g. in an interference template catalog. In the detection and recovery process the compressed samples then have to be checked against the different catalog entries to determine if one of the characterized interferences was present in the captured signal.

The easiest kind of interference is a continuous wave (CW) tone interference which could e.g. be unintentional (a harmonic from some local-oscillator of a different system) or intentionally placed, e.g. on the main lobes of the GNSS signal to be jammed. Moreover, also multitones are possible. The presented interference detection method detects both the frequency and the amplitude of the interference signal within the observation bandwidth. The frequency resolution $f_{res}$ is principally limited by the number of acquired samples n and the sampling rate $F_s$ according to $$f_{res} = \frac{F_s}{n}.$$

Recently some research institutes have characterized different kinds of jammers sold over the Internet, from small cigar-lighter type ones to very sophisticated multi-band jammers, see [16], [4]. In summary, most of them can be modeled as some kind of chirp generator distinguished by their parameters in terms of starting/stopping frequency and sweep period time. Therefore for each of the jammers, one input in the interference template catalog may be used.

Known pulse interference coming from Distance Measuring Equipment (DME) and Tactical Air Navigation (TACAN) systems are present in the E5a/L5 band. The different pulse signals can also be modeled in their time and frequency behavior and filed in the interference template catalog.

The first task for a successful detection is to find a certain representation base that provides sparsity of the interference source to be detected. In the following, the construction of representation matrices $\Psi$ that provide the useful signal sparsity is described for each of the three types of the interferers: CW, chirp and pulse.

At first, reference is made to tones and multitones.

Figure 4:
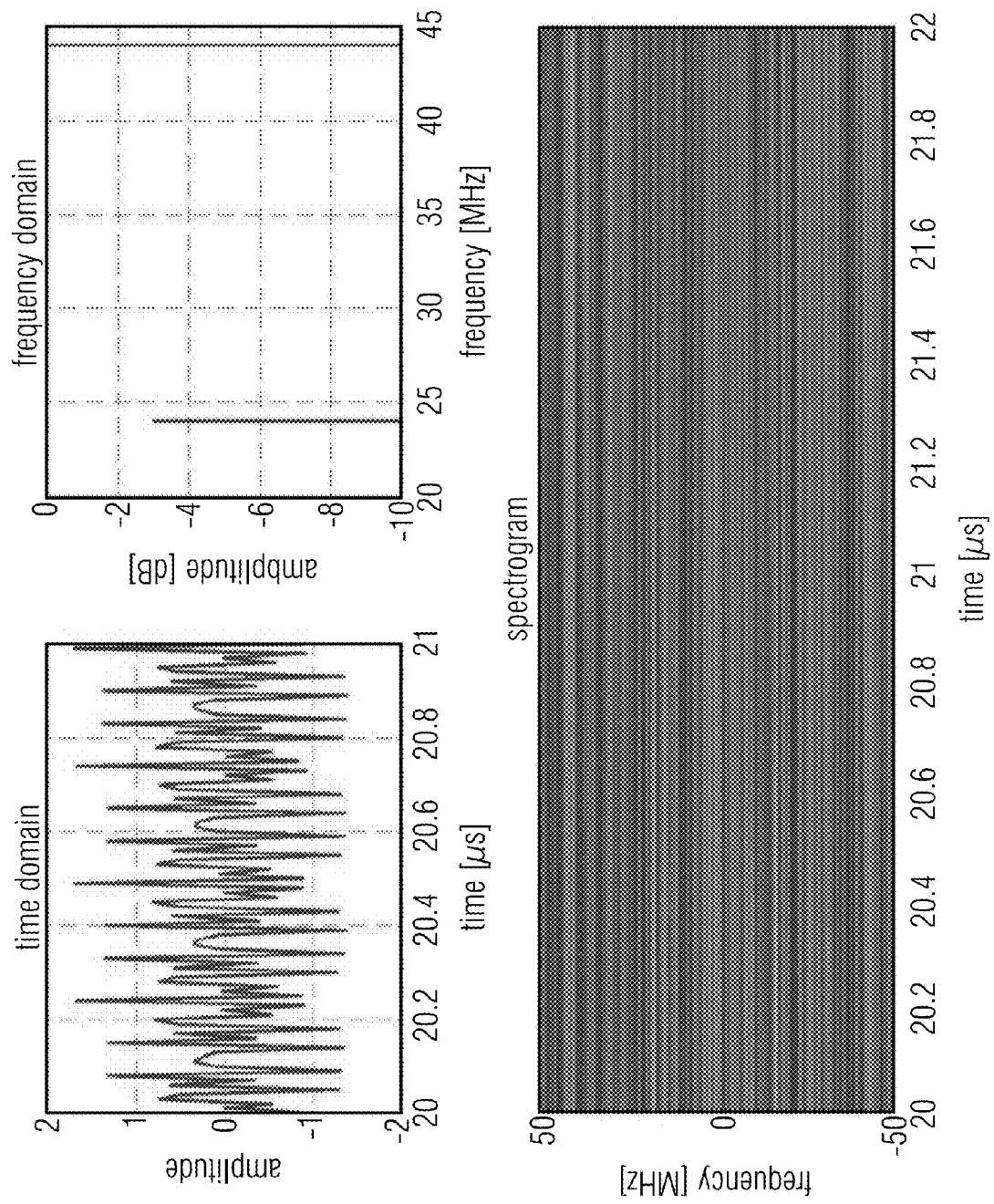
FIG. 4 illustrates an exemplary multitone signal with SNR=30 dB, $f_1$=44 MHz, $f_2$=24 MHz, with $f_2$ having half the power of $f_1$.

FIG. 4 illustrates an exemplary multitone signal with SNR=30 dB, $f_1$=44 MHz, $f_2$=24 MHz, with $f_2$ having half the power of $f_1$. As it can be seen in FIG. 4, CW tones are sparse in the frequency domain. Thus, an appropriate basis function for the signal's sparse representation is an inverse Fourier transform. For time invariant tones and multitones the representation matrix is an n×n inverse discrete Fourier transform (IDFT) matrix $$\Psi_{CW} = \frac{1}{\sqrt{n}} \begin{bmatrix} 1 & 1 & \cdots & \cdots & 1 \\ 1 & e^{-2\pi i/n} & \cdots & \cdots & e^{-2\pi i(n-1)/n} \\ \vdots & \vdots & \ddots & \vdots & \vdots \\ & & \cdots & e^{-2\pi i(n-2)(n-2)/n} & e^{-2\pi i(n-2)(n-1)/n} \\ 1 & e^{-2\pi i(n-1)/n} & \cdots & e^{-2\pi i(n-1)(n-2)/n} & e^{-2\pi i(n-1)(n-1)/n} \end{bmatrix},$$

where n is the number of acquired samples.

Now, reference is made to chirp signals.

By definition, a chirp signal is a signal in which the frequency increases or decreases with a certain slope over the time. Types of a chirp signal are e.g.

Linear chirp: frequency f(t) varies linearly with time $$f(t)=f_0+kt,$$

where $f_0$ is the starting frequency (at time t=0) and k is the rate of frequency increase or chirp rate. The time-domain function for a sinusoidal linear chirp is the sine of a phase in radians $$x(t) = \sin\left[2\pi\left(f_0 t + \frac{k}{2}t^2 + \phi_0\right)\right],$$

where $\phi_0$ is the initial phase.

Exponential chirp: frequency f(t) varies exponentially with time $$f(t)=f_0 k^t,$$

where $f_0$ is the starting frequency (at time t=0) and k is the rate of exponential increase in frequency. The time-domain function for a sinusoidal exponential chirp is the sine of a phase in radians $$x(t) = \sin\left[2\pi f_0 t \frac{k^t - 1}{\ln(k)} + \phi_0\right],$$

where $\phi_0$ is the initial phase.

Figure 5:
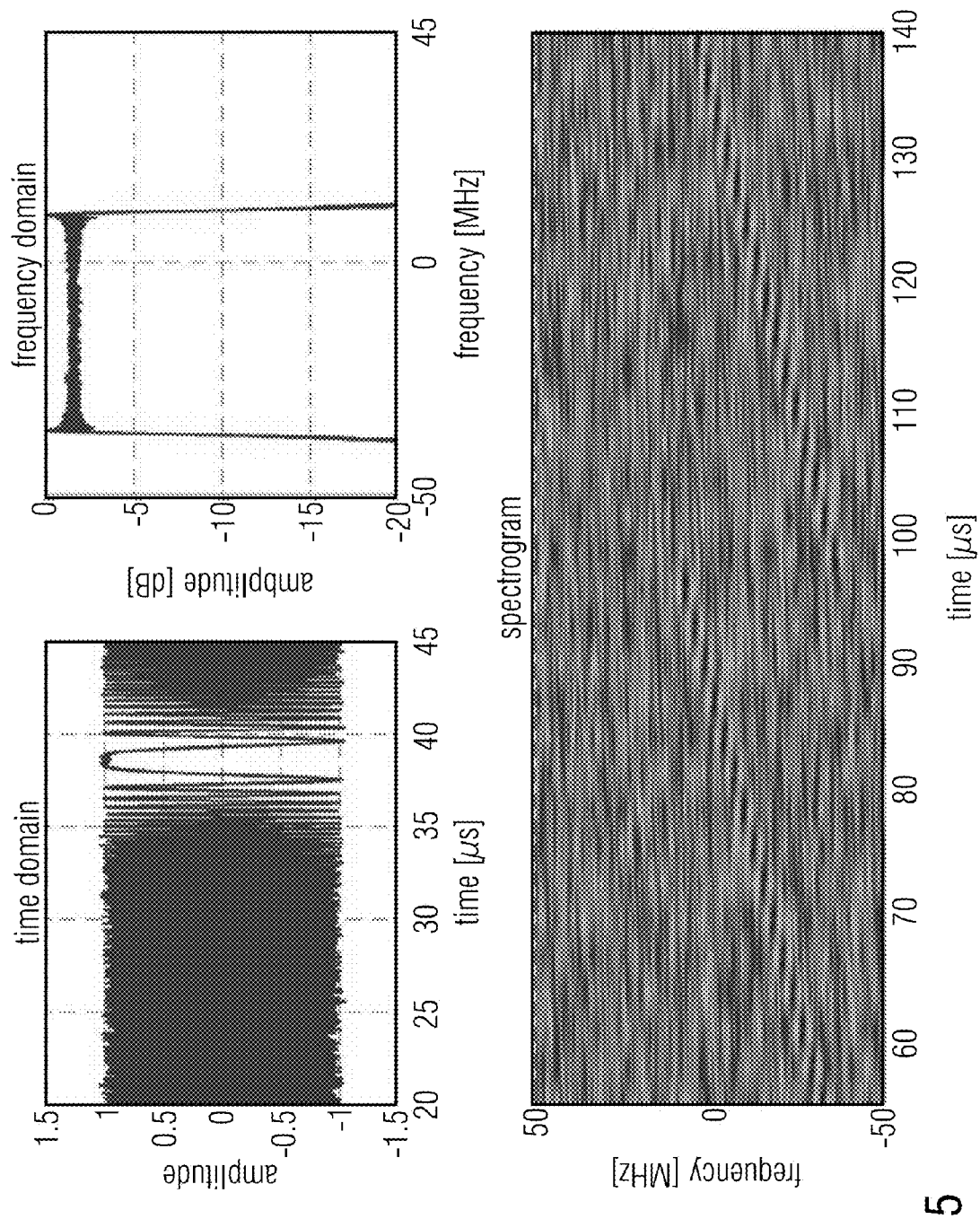
FIG. 5 illustrates an exemplary chirp signal with SNR=30 dB, linear sweep, $f_{start}$=−37 MHz, $f_{stop}$=+11 MHz, period=50 μs.

FIG. 5 illustrates an exemplary chirp signal with SNR=30 dB, linear sweep, $f_{start}$=−37 MHz, $f_{stop}$=+11 MHz, period=50 μs. In particular, FIG. 5 shows an example of a linear chirp signal with increasing frequency and a given repetition period in its time and frequency domain together with its spectrogram. The picture shows that the chirp is neither sparse in the time domain nor in the frequency domain.

For the construction of the representation base for chirps an a priori knowledge about a special chirp signal is used. The basic requirement is that the chirp signal's parameters are stable and repeated in a periodic way. To obtain an independence of time, so that the signal recording position does not have to be synchronized to the period of the chirp, exactly one period of the chirp is used for the representation base. A circulant matrix using a vector that contains exactly the samples of the signal is constructed. An advantage with this approach is that the a priori knowledge of the sparsity one can and will be used in the reconstruction phase.

A basic scheme can be seen on a small example where n samples $[v_1, \ldots, v_n]$ are taken and the size of the representation matrix is n×n:

$$\Psi_{chirp} = \begin{bmatrix} v_1 & v_n & \ldots & v_3 & v_2 \\ v_2 & v_1 & \ddots & \vdots & v_3 \\ \vdots & v_2 & \ddots & \vdots & \vdots \\ v_{n-1} & \vdots & \ddots & \ddots & v_n \\ v_n & v_{n-1} & \ldots & v_2 & v_1 \end{bmatrix}.$$

The set in which the solution x can be found is $S=\{z|\text{supp}(z)=\{k\} \text{ and } z|_{supp(z)}=1, k=1, \ldots, n\}$.

Instead, a brute force reconstruction is used where every possibility from the possible solution set S will be tested to find the best match. Using the a priori knowledge that with this kind of representation matrix the sparsity level is exactly one, the brute force reconstruction algorithm even performs faster than CoSaMP.

Now, reference is made to pulses.

Figure 6:
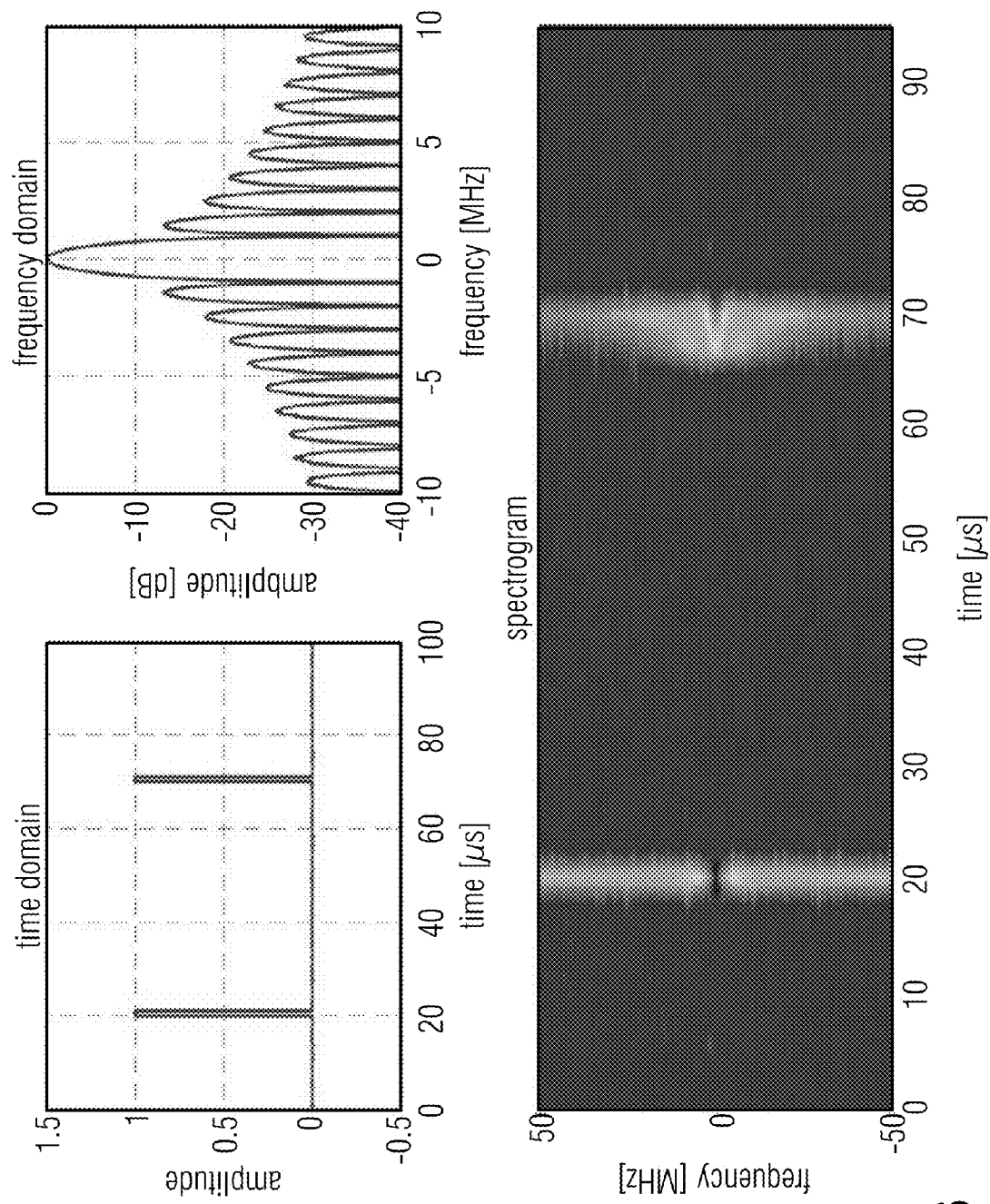
FIG. 6 illustrates an exemplary Rectangular shaped pulse signal with SNR=30 dB, length=1 μs.

FIG. 6 illustrates an exemplary Rectangular shaped pulse signal with SNR=30 dB, length=1 μs. In particular, in FIG. 6 one special kind of pulse is exemplary plotted in its time and frequency domain together with a spectrogram. It can be seen that this pulse has a sparse representation in the time domain.

If the pulse is in the form of a unique spike then it already has a sparse representation in the time domain and a proper representation base would be the spike base. But often pulses are not received in that form: For example, the DME/TACAN pulses have a certain Gaussian shaping with a distinct repetition frequency on a well defined frequency offset or channel. Then an approach similar to that previously described for chirp signals can be used where the pulse time behavior is described in the representation matrix Ψ obtaining independence in the time domain.

An alternative approach where only a time domain description is needed, to also get independence in the frequency domain and from frequency offsets, would be to use the fact that the signal has a sparse representation when the Fourier transformation of only the nonzero parts of the signal is done. As an illustration a rectangular pulse of a length of 20 samples shall be used that starts with the 41st collected sample $$|f| = [\underbrace{0, \ldots, 0}_{40\times}, \underbrace{1, \ldots, 1}_{20\times}, 0, \ldots, 0)]$$

and whose total length is 1000 samples. Then, if the 20×20 inverse DFT matrix is denoted F, the representation matrix would be $$\Psi_{Pulse_{DFT}} = \begin{bmatrix} F & 0 & \ldots & 0 & 0 \\ 0 & F & \ldots & 0 & 0 \\ \vdots & \vdots & \ddots & \vdots & \vdots \\ 0 & 0 & \ldots & F & 0 \\ 0 & 0 & \ldots & 0 & F \end{bmatrix}.$$

Here the fact that the length of the pulse is known is used. Because the appearance of the pulse is not usually known, the exact reconstruction should be obtained by switching through the 20 possible representation matrices by circularly shifting the columns. Additional problems regarding the amplitude occur in the recovery of the Gaussian or Triangular pulse.

In the following, the basic requirements are outlined.

Based on the analysis made in the previous section some requirements for a reliable reconstruction have to be made: The signal to be detected has to be periodic and the number of acquired samples n may be large enough to include the period of the interference signal. Moreover, n depends on the bandwidth to be observed: The higher the bandwidth, the larger the reconstruction matrices for a given time interval are.

Therefore n basically sets the matrix size within the reconstruction process and directly influences the computational complexity. A trade-off has to be made between the computational power and the snapshot size of the monitored bandwidth. The CoSaMP is reported to have a complexity of $O(n \log^2 n)$ [13]. Moreover it is important to find a proper input setting of the algorithm in accordance to the targeted application.

The other mentioned brute force reconstruction algorithm has a linear complexity of O(n) and performs therefore much faster used to recover a sparsity of one.

In the following, simulation results are described.

To investigate the impact of the signal-to-noise ratio (SNR), where the signal actually refers to the interference to be detected, and the downsampling (DSF) or compression factor on the detection probability, a Monte Carlo simulation was done. Each combination of SNR and DSF was simulated 1000 times, and the success rates are given in percentage. The position of the interference signal was chosen in a random uniformly distributed way.

The scenario in the simulation setup was to observe a bandwidth of 100 MHz as it is needed for the Galileo E5 band. A conventional Nyquist sampling approach would have to use e.g. a 100MSPS I/Q ADC. In the proposed AIC approach, only the sampling rate $P_c$ of the PN generator has to fulfill the Nyquist criteria. Therefore a low-rate ADC with a sampling rate of 100/DSF MSPS can be used. The preceding anti-aliasing filter was set to have a 3 dB bandwidth according to the Nyquist frequency of the low-rate ADC. A simple FIR filter with an order l of 50 was used to that purpose. The acquired sample size n was 1000 while the stored sample size m was determined according to Equation 6.

Monte Carlo simulations were also carried out to verify that the proposed methods could reliably distinguish between different kind of interferers that belong to the same group but have different parameters (e.g. between two chirp signals with different start and/or stop frequency) and between interferers from different groups (e.g. between a chirp and a CW or a pulse).

At first, reference is made to tones and multitones simulation.

Figure 7:
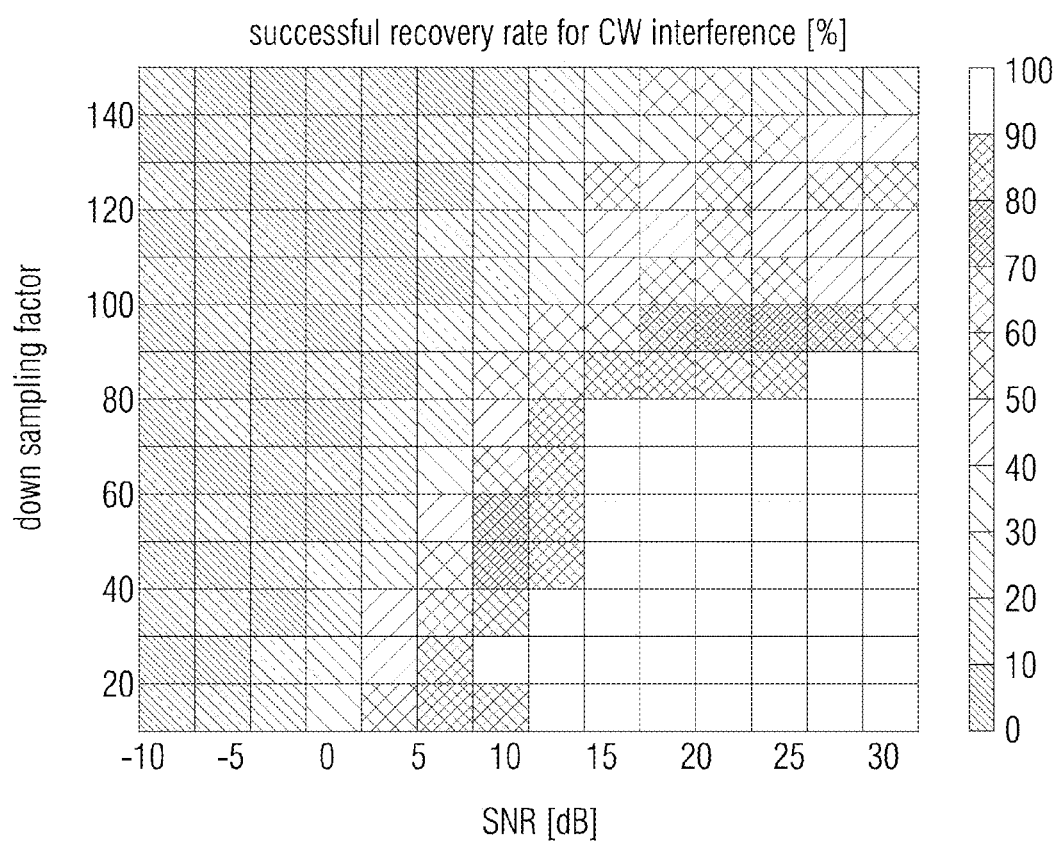
FIG. 7 illustrates a recovery rate of a single tone with $f_1$=44 MHz using CoSaMP in dependence of the downsampling factor and SNR.

FIG. 7 illustrates a recovery rate of a single tone with $f_1=44$ MHz using CoSaMP in dependence of the downsampling factor and SNR. The reconstruction and detection of tones and multitones was done using CoSaMP, the algorithm described above. As expected and shown in FIG. 7, the detection probability is better for higher SNR and lower downsampling factors. It can be seen that a downsampling factor of 80 still provides very high detection probability when the SNR is larger than 10 dB. In other words, instead of using an I/Q ADC with sampling rates of 100 MHz, a low-rate I/Q ADC with 1.25 MHz would be sufficient. Additionally, the snapshot size is inversely proportional to the downsampling factor.

The simulations shown in FIG. 7 were performed assuming a single tone. The results obtained for multitones were similar and therefore are not shown here.

Now, reference is made to chirp simulation.

The recovery of a chirp signal with a start frequency of −37 MHz and a stop frequency of +11 MHz (as depicted in FIG. 5) was simulated while the chirp start period was uniformly randomly chosen within the recorded chirp period.

The used brute force signal recovery technique relies on the knowledge that the chirp representation matrix constructed as explained above provides a sparsity of exactly one in x where all other values are zero. The brute force approach tests all possible solutions and returns the best match as explained above, see also Equation 13.

Figure 8:
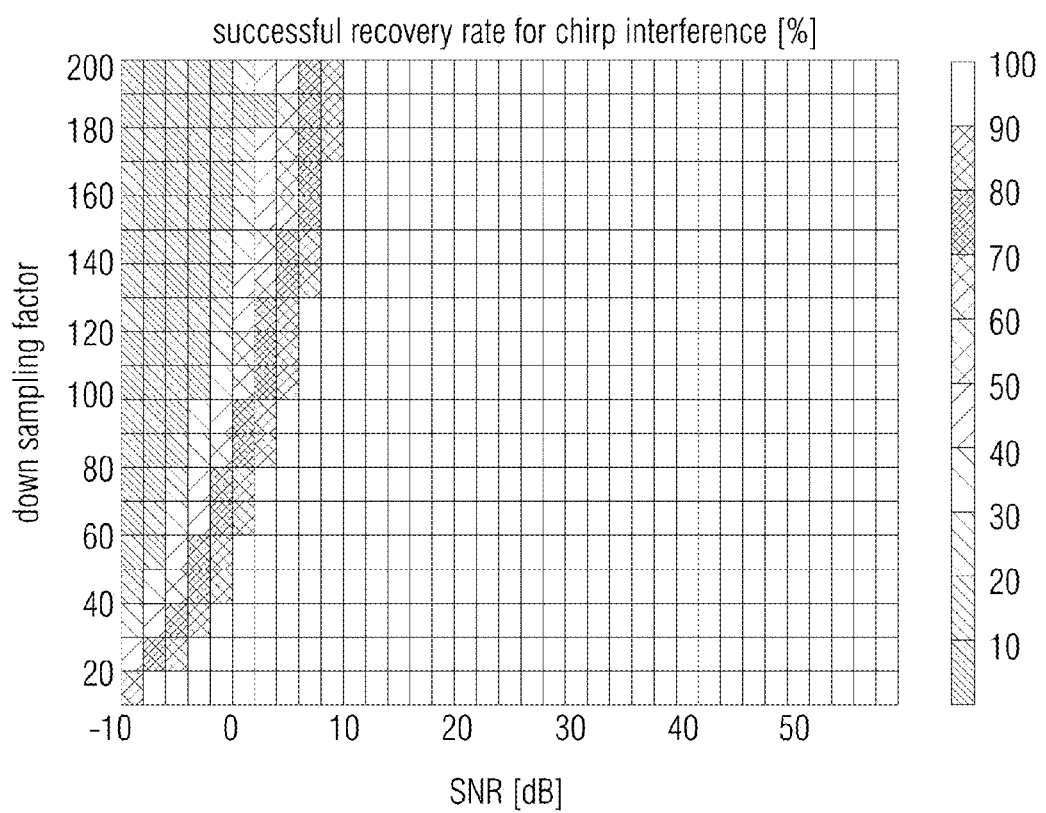
FIG. 8 illustrates a recovery rate of a chirp signal with $f_{start}$=−37 MHz, $f_{stop}$=+11 MHz using brute force in dependence of the downsampling factor and SNR.

FIG. 8 illustrates a recovery rate of a chirp signal with $f_{start}$=−37 MHz, $f_{stop}$=+11 MHz using brute force in dependence of the downsampling factor and SNR. The simulation results in FIG. 8 show a perfect recovery rate even with downsampling factors of up to 200 above and SNR values above 10 dB. These excellent results came from the brute force recovery approach and the fact the representation matrix and recovery algorithms are insensitive to the chirp's amplitude which, may e.g. usually assumed to be normalized, in contrast to what CoSaMP is doing.

In practice one may distinguish between different kind of chirp signals, e.g. the different chirp jammers characterized in a database. Therefore it is useful to reconstruct the result with different representation bases and to identify the most probable one. When the chirp is not included in the recovery database, then all the computed residuals should be similarly high because none of them is the solution.

To distinguish between different possible chirp signals the brute force approach also tests all possible solutions for every cataloged type of the chirp. The l2-norm of the residual $r_{i,k}$, where the subscripts i and k respectively represent the type of chirp and the solution set, is computed. Then, for each chirp type the smallest value, e.g.

$$r_{i,min} = \min_{k} r_{i,k}$$

is taken. The distance to the other possible solutions is calculated in a logarithmically way and expressed as a normalized threshold TH:

$$TH_i = 20 \log\left[\min_{i} (1/r_{i,min})/(1/r_{i,min})\right]. \quad (14)$$

A simulation with five different kinds of chirps (different start, stop frequencies and frequency rates) at a downsampling factor of 100 with different SNR was made and the threshold values TH was calculated according to Equation 14. The results are given in Table 1.

TABLE 1

Table 1: The values of the $TH_i$; i = 1, ..., 5 for different SNR when $Chirp_1$ should be detected

|  | $Chirp_1$ | $Chirp_2$ | $Chirp_3$ | $Chirp_4$ | $Chirp_5$ |
|---|---|---|---|---|---|
| $f_{start}$ | −1 MHz | 2 MHz | 0 MHz | 2 MHz | −4 MHz |
| $f_{stop}$ | 2 MHz | −1 MHz | 2 MHz | 1 MHz | 5 MHz |

| DSF = 100 SNR [dB] | $Chirp_1$ [dB] | $Chirp_2$ [dB] | $Chirp_3$ [dB] | $Chirp_4$ [dB] | $Chirp_5$ [dB] |
|---|---|---|---|---|---|
| −10 | 0 | 0.35 | 0.38 | 0.26 | 0.40 |
| −5 | 0 | 1.24 | 1.46 | 1.53 | 1.56 |
| 0 | 0 | 2.38 | 3.49 | 4.07 | 3.59 |
| 5 | 0 | 5.60 | 6.88 | 7.52 | 8.18 |
| 10 | 0 | 9.01 | 11.65 | 11.84 | 12.23 |
| 15 | 0 | 12.96 | 15.90 | 16.47 | 16.24 |
| 20 | 0 | 17.29 | 21.15 | 21.72 | 21.67 |
| 25 | 0 | 22.71 | 26.71 | 27.28 | 27.33 |
| 30 | 0 | 29.38 | 32.43 | 32.44 | 32.57 |
| 35 | 0 | 32.78 | 36.09 | 36.54 | 36.61 |
| 40 | 0 | 37.14 | 41.69 | 41.55 | 41.81 |
| 45 | 0 | 43.15 | 47.03 | 47.28 | 47.22 |
| 50 | 0 | 47.35 | 50.90 | 51.27 | 50.98 |

The conclusion based on Table 1 is that using a threshold TH of 5 dB, different kind of chirps with SNR values above 5 dB can reliably be detected at a downsampling factor of 100. This result is in accordance to the detection probability results illustrated in FIG. 8.

Now, reference is made to pulse simulation.

As was the case for the chirp signals, the measurement matrix A for pulse signals does not satisfy the RIP. Thus, again the brute force reconstruction approach is also used for pulses' detection.

Figure 10:
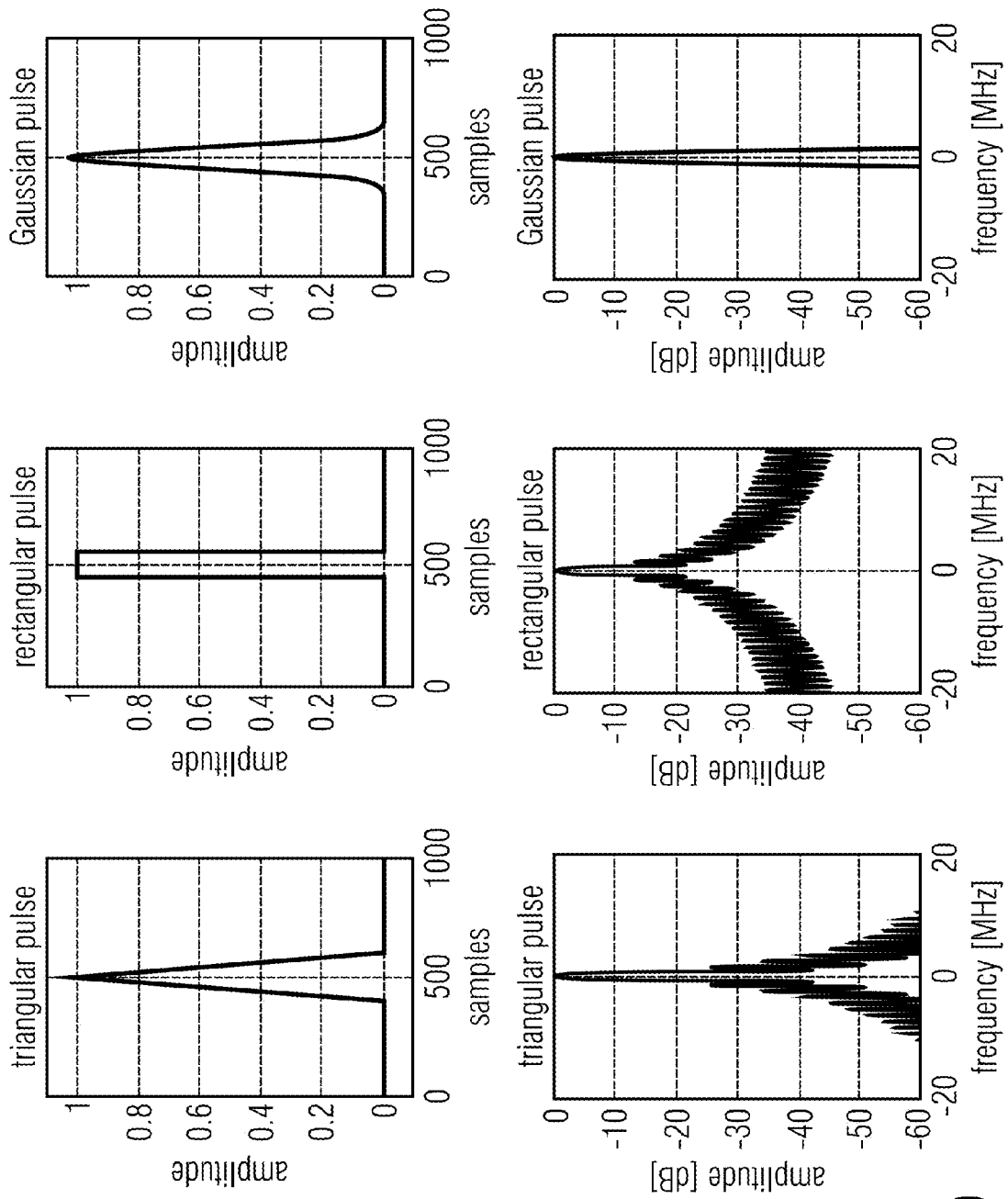
FIG. 10 illustrates different pulse shapes used in the simulation to be distinguished.
Figure 11:
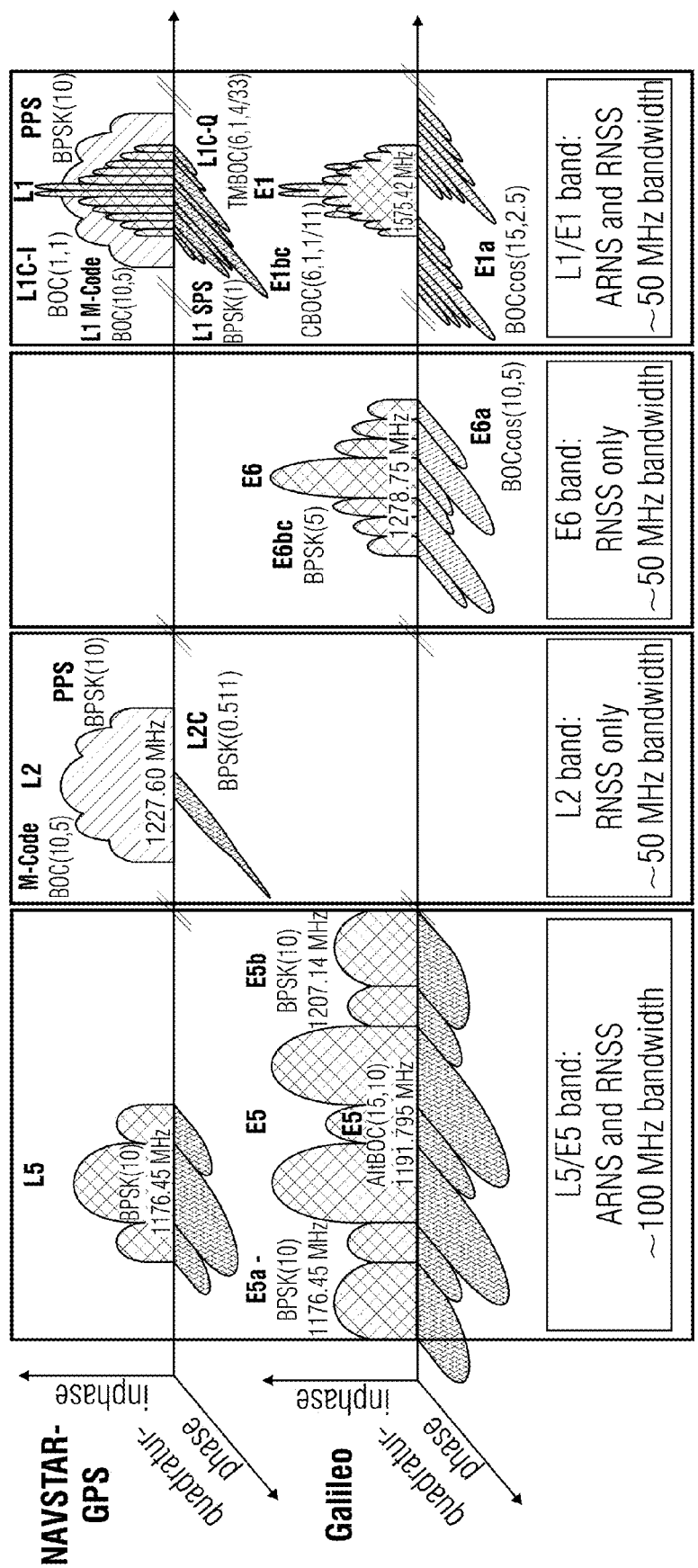
FIG. 11 illustrates the L-band spectrum of the current and planned GPS and Galileo global navigation satellite system signals.

In the following Monte Carlo simulation, three different kind of shaped pulses (Triangular, Rectangular, Gaussian), all with the same signal power in relation to a 100 samples long, normalized rectangular pulse were tested. The different pulses are depicted in FIG. 10 in their time and frequency domain. In the Monte Carlo simulation their starting position was uniformly randomly chosen within the 1000 acquired samples n.

Figure 9:
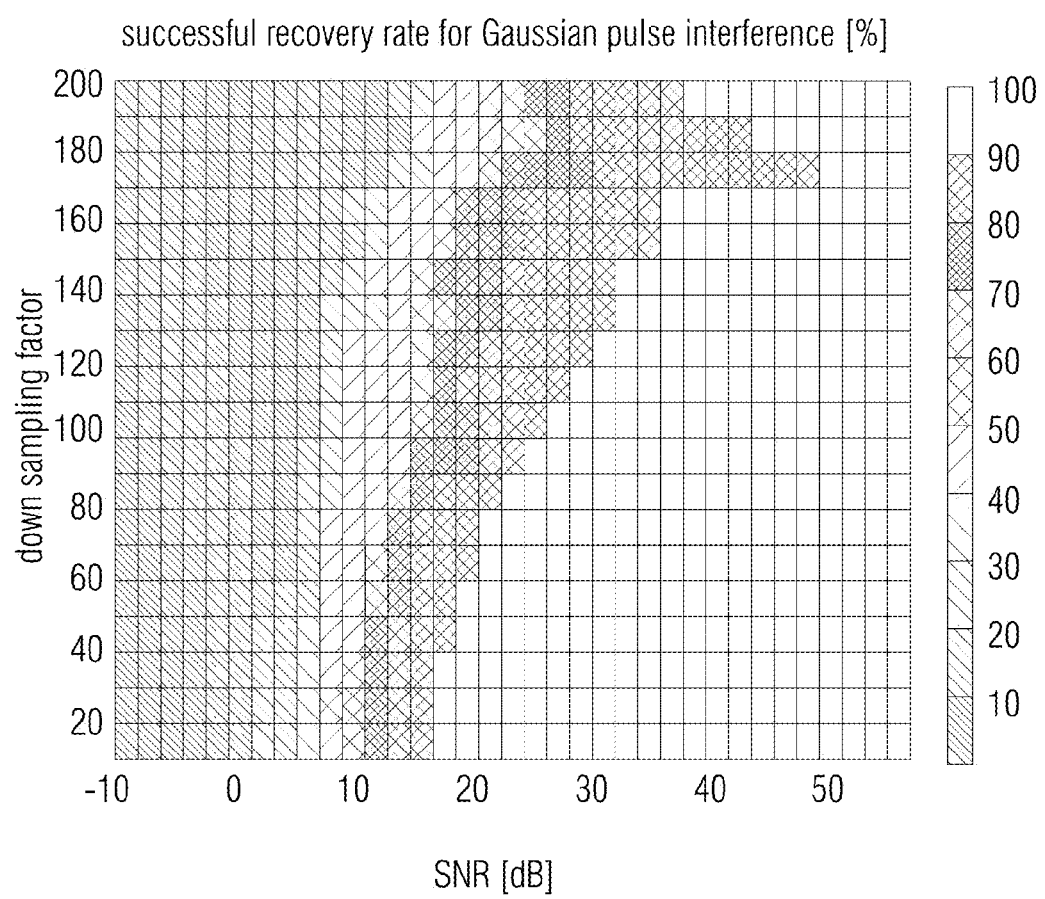
FIG. 9 illustrates a recovery rate of a Gaussian pulse.

FIG. 9 illustrates a recovery rate of a Gaussian pulse. Looking at FIG. 9 it can be seen that the pulse recovery does not perform as excellent as for the chirp signal. It is concluded that the success of the recovery does not only depend on the SNR and the downsampling factor, but also on the amount of the signal information used. For downsampling factors up to 100 and for SNRs above 20 dB the detection probability is very good.

FIG. 10 illustrates different pulse shapes used in the simulation to be distinguished. To determine the possible threshold that would make it possible to distinguish between different pulses, the three main pulses shown in FIG. 10 were used.

As was done for the chirp signals, the brute force approach tests all possible solutions for each type of cataloged pulse. The TH distance between the best match for each type of pulse is calculated as explained in Equation 14.

TABLE 2

| DSF = 80, SNR [dB] | Triangular pulse [dB] | Rectangular pulse [dB] | Gaussian pulse [dB] |
|---|---|---|---|
| −10 | 0.15 | 0.10 | 0.00 |
| −5 | 0.06 | 0.00 | 0.05 |
| 0 | 0.45 | 1.45 | 0.00 |
| 5 | 0.00 | 2.70 | 2.51 |
| 10 | 0.00 | 0.45 | 5.92 |

TABLE 2-continued

| DSF = 80, SNR [dB] | Triangular pulse [dB] | Rectangular pulse [dB] | Gaussian pulse [dB] |
|---|---|---|---|
| 15 | 0.00 | 7.85 | 5.72 |
| 20 | 0.00 | 16.17 | 5.26 |
| 25 | 0.26 | 12.24 | 0.00 |
| 30 | 0.00 | 22.93 | 17.61 |
| 35 | 0.00 | 25.17 | 22.47 |
| 40 | 0.00 | 33.46 | 32.72 |
| 45 | 0.00 | 32.20 | 36.55 |
| 50 | 0.00 | 38.97 | 39.25 |

Table 2 illustrates the values of the $TH_i$; i=1, 2, 3 for different SNR when a Triangular pulse should be detected.

TABLE 3

| DSF = 80, SNR [dB] | Triangular pulse [dB] | Rectangular pulse [dB] | Gaussian pulse [dB] |
|---|---|---|---|
| −10 | 0.00 | 0.00 | 0.12 |
| −5 | 0.26 | 0.00 | 0.11 |
| 0 | 0.34 | 0.00 | 0.53 |
| 5 | 2.82 | 0.00 | 1.97 |
| 10 | 4.54 | 0.00 | 8.01 |
| 15 | 1.43 | 0.00 | 9.28 |
| 20 | 9.53 | 0.00 | 13.08 |
| 25 | 16.25 | 0.00 | 18.86 |
| 30 | 15.54 | 0.00 | 19.74 |
| 35 | 25.11 | 0.00 | 28.54 |
| 40 | 30.09 | 0.00 | 35.09 |
| 45 | 29.93 | 0.00 | 33.41 |
| 50 | 41.64 | 0.00 | 49.97 |

Table 3 illustrates the values of the $TH_i$; i=1; 2; 3 for different SNR when the Rectangular Pulse should be detected.

TABLE 4

| DSF = 80, SNR [dB] | Triangular pulse [dB] | Rectangular pulse [dB] | Gaussian pulse [dB] |
|---|---|---|---|
| −10 | 0.31 | 0.44 | 0.00 |
| −5 | 0.20 | 0.00 | 0.70 |
| 0 | 1.54 | 1.93 | 0.00 |
| 5 | 1.21 | 8.39 | 0.00 |
| 10 | 9.17 | 12.81 | 0.00 |
| 15 | 2.91 | 10.73 | 0.00 |
| 20 | 6.85 | 8.99 | 0.00 |
| 25 | 16.88 | 20.43 | 0.00 |
| 30 | 14.39 | 17.96 | 0.00 |
| 35 | 16.93 | 23.44 | 0.00 |
| 40 | 24.79 | 39.22 | 0.00 |
| 45 | 43.25 | 47.39 | 0.00 |
| 50 | 46.05 | 46.56 | 0.00 |

Table 4 illustrates the values of the $TH_i$; i=1; 2; 3 for different SNR when the Gaussian Pulse should be detected.

The Tables 2, 3 and 4 respectively show the detection performance when Triangular, Rectangular and Gaussian shaped pulses should be detected. A downsampling factor of 80 was used while the SNR was varied.

The conclusion based on Tables 2, 3 and 4 is that with a threshold TH of 5 dB, different kinds of pulses with SNR values above 20 dB can reliably be detected at a downsampling factor of 80.

Above, new concepts for interference detection of previously characterized interferes was presented. The concepts can be used to efficiently monitor e.g. the up to 100 MHz wide GNSS bands without having to use a Nyquist sampling receiver which would have very high data rates and high raw data storage requirements. Instead a compressed sensing random demodulator analog-to-information converter (AIC) architecture was proposed. Its key element is the random demodulator which operates at the signal's Nyquist rate. The random demodulator spreads the signal's characteristic signature over a wide frequency band. A low-rate ADC is now sufficient to sample a small portion of the signature.

Using the knowledge about the interference detection receiver's architecture and the well characterized interference signals to be detected, it is possible to reconstruct the original signal out of very few samples. A key element of a successful recovery is the setup of an interference characterization database where all interferences to be detected are filed. The construction of the useful representation matrices for the interfere types of CW, Chirps, and Pulses was explained in detail.

For the reconstruction of CW signals, a CoSaMP algorithm was used and was shown to be insensitive to the CW frequency and amplitude. For the reconstruction of chirps and pulses a brute force approach was used. The brute force method uses the a priori knowledge of the interferer and its periodic nature. It is insensitive to the interferer appearance in time domain, but can only reconstruct a normalized version of the signal.

Monte Carlo simulations were carried out to investigate the detection probability for varying downsampling factors and signal-to-noise ratios. Additional simulations were performed to quantify the algorithm's ability to distinguish between several interferers belonging to the same family but having different parameters.

The simulation results show excellent detection rates and also demonstrate the possibility to distinguish between several interferers with a margin larger than 5 dB for CW tones: for SNR higher than 10 dB and DSF of 80
Chirps: for SNR higher than 10 dB and DSF of 200
Pulses: for SNR higher than 20 dB and DSF of 80

To conclude, with this AIC approach a downsampling factor of 80 provides a reliable high detection probability if the SNR is larger than 20 dB for all cases. In other words, instead of using an I/Q ADC with sampling rates of 100 MHz, a low-rate I/Q ADC with 1.25 MHz is sufficient. The snapshot size and storage requirements decrease accordingly by a factor of 80.

A basic AIC hardware demonstrator setup may be implemented based on the concepts of the above-described embodiments of the present invention. The impact of "real hardware" parameters such as quantization or mismatch between the AIC implementation and how it is modelled in the signal reconstruction may e.g. be taken into account.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] A. G. Proctor, C. W. T. Curry, J. Tong, R. Watson, M. Greaves, and P. O. S. Cruddace, "Protecting the UK Infrastructure—A System to Detect GNSS Jamming and Interference," inside GNSS, vol. September/October, pp. 49-57, 2011.

[2] R. Bauernfeind, A. Sicramaz Ayaz, and B. Eissfeller, "GNSS Interference Monitoring Network Based on Detection in Automotive ITS Station Receivers," in Proceedings of the 24th International Technical Meeting of The Satellite Division of the Institute of Navigation (ION GNSS 2011), 2011.

[3] C.-C. Sun and S.-S. Jan, "Interference characteristics for the civil airport environment using time-frequency analysis," in Proceedings of IEEE/ION PLANS 2012, Myrtle Beach, S.C., April 2012, pp. 347-354, 2012.

[4] R. H. Mitch, R. C. Dougherty, M. L. Psiaki, S. P. Powell, B. W. O'Hanlon, J. A. Bhatti, and T. E. Humphreys, "Signal characteristics of civil GPS jammers," in 24th International Technical Meeting of the Satellite Division of The Institute of Navigation, Portland Oreg., 2011.

[5] J. Bhatti, T. Humphreys, and B. Ledvina, "Development and Demonstration of a TDOA-Based GNSS Interference Signal Localization System," in Proceedings of IEEE/ION PLANS 2012, Myrtle Beach, S.C., April 2012, pp. 455-469, 2012.

[6] J. Tropp, J. Laska, M. Duarte, J. Romberg, and R. Baraniuk, "Beyond nyquist: Efficient sampling of sparse bandlimited signals," Information Theory, IEEE Transactions on, vol. 56, pp. 520-544, January 2010.

[7] E. J. Candès and M. B. Wakin, "An Introduction to Compressive Sampling," IEEE signal processing magazine, pp. 21-30, March 2008.

[8] E. J. Candès, "Compressive sampling," in Proceedings of the International Congress of Mathematicians, Madrid, Spain, 2006, 2006.

[9] E. Candès and J. Romberg, "$l_1$-MAGIC. Recovery of sparse signals via convex programming," October 2005.

[10] Y. Pati, R. Rezaiifar, and P. Krishnaprasad, "Orthogonal matching pursuit: recursive function approximation with applications to wavelet decomposition," in Signals, Systems and Computers, 1993. 1993 Conference Record of The Twenty-Seventh Asilomar Conference on, pp. 40-44 vol. 1, November 1993.

[11] D. Needell and R. Vershynin, "Uniform Uncertainty Principle and Signal Recovery via Regularized Orthogonal Matching Pursuit," Found. Comput. Math., vol. 9, pp. 317-334, April 2009.

[12] D. Donoho, Y. Tsaig, I. Drori, and J. Starck, "Sparse solution of undetermined systems of linear equations by stagewise orthogonal matching pursuit," IEEE Transactions on information theory, vol. 58, pp. 1094-1121, February 2012.

[13] D. Needell and J. A. Tropp, "CoSaMP: iterative signal recovery from incomplete and inaccurate samples," Commun. ACM, vol. 53, pp. 93-100, December 2010.

[14] D. Needell, "Topics in Compressed Sensing," 2009.

[15] S. Foucart, "Sparse recovery algorithms: sufficient conditions in terms of restricted isometry constants.," in Springer Proceedings in Mathematics, Approximation Theory XIII: San Antonio 2010, pp. 65-77, 2012.

[16] T. Kraus, R. Bauernfeind, and B. Eissfeller, "Survey of In-Car Jammers—analysis and modeling of the RF signals and IF samples (suitable for active signal cancellation)," in 24th International Technical Meeting of the Satellite Division of The Institute of Navigation, Portland Oreg., 2011.

[17] J. Romberg, "Compressive sensing by random convolution," SIAM J. Img. Sci., vol. 2, pp. 1098-1128, November 2009.

[18] W. U. Bajwa, J. D. Haupt, G. M. Raz, S. J. Wright, and R. D. Nowak, "Toeplitz-structured compressed sensing matrices," in Proceedings of the 2007 IEEE/SP 14th Workshop on Statistical Signal Processing, SSP '07, (Washington, D.C., USA), pp. 294-298, IEEE Computer Society, 2007

The invention claimed is:

1. A system for determining an actual interferer transmitting an interfering signal comprising first frequency portions of the interfering signal in a predetermined frequency band of a useful signal, wherein the system comprises:
an antenna module for receiving a transmitted radio signal to acquire a received radio signal comprising second frequency portions of the transmitted radio signal in the predetermined frequency band,
an RF front-end for processing the received radio signal to acquire a preprocessed signal,
a signal demodulator for processing the preprocessed signal to acquire a compressed signal,
a signal evaluator for identifying the actual interferer,
wherein the signal evaluator is configured to determine for each possible interferer of the plurality of possible interferers coefficient information of said possible interferer based on representation information of said possible interferer and based on processing information, such that the coefficient information of said possible interferer and the representation information of said possible interferer together indicate the preprocessed signal, wherein the processing information and the preprocessed signal together indicate the compressed signal,
wherein the signal evaluator is configured to determine a possible interferer of the plurality of possible interferers as the actual interferer based on the coefficient information of each of the plurality of possible interferers.

2. The system according to claim 1,
wherein the system furthermore comprises a database having stored therein the representation information for each possible interferer of the plurality of possible interferers,
wherein the signal evaluator is configured to acquire for each possible interferer of the plurality of possible interferers the interferer representation information of said interferer from the database, and
wherein the database is configurable so that further representation information of further possible interferers is storable in the database.

3. The system according to claim 1,
wherein the system is configured to determine the actual interferer transmitting the interfering signal comprising signal portions in the predetermined frequency band of the useful signal, wherein the useful signal is a GNSS signal, and wherein the predetermined frequency band is a frequency band of the GNSS signal,
wherein the antenna module is configured to receive the transmitted radio signal to acquire the received radio signal comprising signal portions in the predetermined frequency band being the frequency band of the GNSS signal, and
wherein the RF front-end is configured to process the received radio signal comprising the signal portions in the frequency band of the GNSS signal to acquire the preprocessed signal.

4. The system according to claim 1, wherein the system is configured to determine the actual interferer transmitting the interfering signal comprising signal portions in the predetermined frequency band of the useful signal, wherein the useful signal is a UMTS signal or an LTE signal, and wherein the predetermined frequency band is a frequency band of the UMTS signal or the LTE signal.

5. The system according to claim 1, wherein the system is configured to determine the actual interferer transmitting the interfering signal, wherein the interfering signal is a continuous wave signal, a chirp signal or a pulse signal.

6. The system according to claim 1,
wherein the signal demodulator comprises a sequence demodulator for modulating the preprocessed signal with a predetermined data sequence to acquire a demodulated signal,
wherein the signal demodulator is configured to determine the compressed signal based on the demodulated signal.

7. The system according to claim 6,
wherein the signal demodulator furthermore comprises a filter unit for conducting a filter operation on the demodulated signal to acquire a filtered signal,
wherein the signal demodulator is configured to determine the compressed signal based on the filtered signal.

8. The system according to claim 7, wherein the filter unit is a Finite Impulse Response filter.

9. The system according to claim 7, wherein the signal demodulator furthermore comprises an analog-to-digital converter for converting the filtered signal being an analog signal into the compressed signal being a digital signal.

10. The system according to claim 9,
wherein the signal evaluator is configured to determine for each possible interferer of the plurality of possible interferers sparsity information of said possible interferer, wherein a coefficient vector x of said possible interferer comprises a plurality of coefficients, and wherein the signal evaluator is configured to determine the sparsity information based on the plurality of coefficients of the coefficient vector of said possible interferer,
wherein the signal evaluator is configured to determine a possible interferer of the plurality of possible interferers as the actual interferer based on the sparsity information of each of the plurality of possible interferers.

11. The system according to claim 10,
wherein the signal evaluator is configured to determine for each possible interferer of the plurality of possible interferer the coefficient vector x of said possible interferer as the coefficient information of said possible interferer according to the formula $$\hat{y}=A\cdot x,$$

wherein $\hat{y}$ is a first vector indicating the compressed signal,
wherein A is a measurement matrix of said possible interferer,
wherein the measurement matrix A is defined according to the formula $$A=R\cdot H\cdot D\cdot \Psi,$$

wherein R, H, D and $\Psi$ are matrices,
wherein $\Psi$ indicates the representation information of said interferer,
wherein the processing information comprises the matrices R, H and D,
wherein $$f_{spread}=D\cdot f$$

defines a second vector $f_{spread}$ indicating the demodulated signal, and wherein f is a third vector indicating the preprocessed signal,
wherein $$y=H\cdot D\cdot f,$$

defines a fourth vector y indicating the filtered signal, and wherein $$\hat{y}=R\cdot H\cdot D\cdot f$$

defines the first vector $\hat{y}$ indicating the compressed signal.

12. The system according to claim 1,
wherein the signal evaluator is configured to determine for each possible interferer of the plurality of possible interferers a coefficient vector x of said possible interferer as the coefficient information of said possible interferer according to the formula $$\hat{y} = A \cdot x,$$

wherein $\hat{y}$ is a first vector indicating the compressed signal, wherein A is a measurement matrix of said possible interferer, wherein the measurement matrix depends on the representation information of said possible interferer and on the processing information.

13. The system according to claim 1, wherein the signal evaluator is configured to apply a signal reconstruction algorithm to determine the possible interferer of the plurality of possible interferers.

14. The system according to claim 13, wherein the signal evaluator is configured to apply a Compressed Sampling Matching Pursuit, a brute force algorithm, a greedy algorithm, a convex relaxation algorithm or a combinatorial algorithm as the signal reconstruction algorithm to determine the possible interferer of the plurality of possible interferers.

15. A method for determining an actual interferer transmitting an interfering signal comprising first frequency portions of the interfering signal in a predetermined frequency band of a useful signal, wherein the method comprises:
receiving a transmitted radio signal by an antenna module to acquire a received radio signal comprising second frequency portions of the transmitted radio signal in the predetermined frequency band,
processing the received radio signal by an RF front-end to acquire a preprocessed signal,
processing the preprocessed signal to acquire a compressed signal,
determining for each possible interferer of the plurality of possible interferers coefficient information of said possible interferer based on representation information of said possible interferer and based on processing information, such that the coefficient information of said possible interferer and the representation information of said possible interferer together indicate the preprocessed signal, wherein the processing information and the preprocessed signal together indicate the compressed signal, and
determining a possible interferer of the plurality of possible interferers as the actual interferer based on the coefficient information of each of the plurality of possible interferers.

16. The method according to claim 15, wherein the method further comprises identifying for each possible interferer of the plurality of possible interferers the representation information of said possible interferer.

17. The method according to claim 16, wherein said identifying for each possible interferer of the plurality of possible interferers the representation information of said possible interferer is conducted based on a candidate signal being assigned to said interferer and by determining a candidate coefficient vector x of said possible interferer such that the formula $$f^{(i)} = \Psi \cdot x$$

holds true,
wherein $f^{(i)}$ is the candidate signal being assigned to said interferer,
wherein $\Psi$ is a matrix indicating the representation information of said interferer,
wherein x is the candidate coefficient vector comprising a plurality of coefficients, and
wherein the candidate coefficient vector x is determined according to a sparsity rule.

18. The method according to claim 17, wherein said identifying for each possible interferer of the plurality of possible interferers the representation information of said possible interferer comprises determining the candidate coefficient vector x of said possible interferer according to the sparsity rule so that at least some of the coefficients of said coefficient vector x are zero.

19. The method according to claim 17, wherein said identifying for each possible interferer of the plurality of possible interferers the representation information of said possible interferer comprises determining the candidate coefficient vector x of said possible interferer according to the sparsity rule so that at least some of the coefficients of said coefficient vector x belong to a first group of coefficients, so that all the other coefficients of the said coefficient vector x belong to a second group of coefficients, and so that the arithmetic average of the values of the coefficients of the first group of coefficients is at least 100 times greater than the arithmetic average of the values of the coefficients of the second group of coefficients.

20. A non-transitory computer readable medium including a computer program for implementing the method of claim 15 when being executed on a computer or signal processor.

* * * * *